United States Patent
Byun

(10) Patent No.: US 11,921,630 B2
(45) Date of Patent: *Mar. 5, 2024

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,717

(22) Filed: Jul. 5, 2022

(65) Prior Publication Data

US 2022/0334962 A1  Oct. 20, 2022

Related U.S. Application Data

(63) Continuation of application No. 16/872,638, filed on May 12, 2020, now Pat. No. 11,379,364, which is a (Continued)

(30) Foreign Application Priority Data

Mar. 28, 2018  (KR) .......................... 10-2018-0036137

(51) Int. Cl.
*G06F 12/00* (2006.01)
*G06F 12/06* (2006.01)

(52) U.S. Cl.
CPC .. *G06F 12/0607* (2013.01); *G06F 2212/1044* (2013.01)

(58) Field of Classification Search
CPC ............ G06F 12/0238; G06F 12/0246; G06F 12/0607; G06F 12/0851; G06F 2212/1044
See application file for complete search history.

(56) References Cited

U.S. PATENT DOCUMENTS 10,445,229 B1 * 10/2019 Kuzmin ................. G06F 8/654
10,671,528 B2 * 6/2020 Byun .................. G06F 12/0246
(Continued)

FOREIGN PATENT DOCUMENTS

| CN | 106909521 A | 6/2017 |
| CN | 107450845 A | 12/2017 |

(Continued)

OTHER PUBLICATIONS

Office Action for the Chinese Patent Application No. 201811430791.6 issued by the Chinese Patent Office dated Nov. 1, 2022.
(Continued)

*Primary Examiner* — Shawn X Gu
(74) *Attorney, Agent, or Firm* — IP & T GROUP LLP

(57) ABSTRACT

A memory system may comprise: a memory device including a plurality of memory dies; and a controller including a first memory, Wherein the controller may store data segments of user data, corresponding to a plurality of commands received from a host, in the first memory, controls the memory device to sequentially store the data segments in the memory dies through interleaving, may update map segments of map data corresponding to storage of the data segments in the memory dies, may store the map segments in the first memory, controls the memory device to store the map segments stored in the first memory in the memory dies, and may assist the host in storing the map segments, stored in the first memory, in a second memory in the host.

30 Claims, 14 Drawing Sheets

Related U.S. Application Data continuation of application No. 16/156,730, filed on Oct. 10, 2018, now Pat. No. 10,671,528.

(56) References Cited

U.S. PATENT DOCUMENTS

| | | | |
|---|---|---|---|
| 11,379,364 B2 * | 7/2022 | Byun | G06F 12/0246 |
| 2017/0371548 A1 * | 12/2017 | Um | G06F 12/0246 |
| 2018/0004440 A1 | 1/2018 | Byun | |

FOREIGN PATENT DOCUMENTS

| | | |
|---|---|---|
| CN | 107622019 A | 1/2018 |
| CN | 110321069 B | 1/2024 |
| KR | 20180016679 A | 2/2018 |

OTHER PUBLICATIONS

Office Action for the Chinese Patent Application No. 201811430791.6 issued by the Chinese Patent Office dated May 8, 2023.
Notice of Allowance on the Chinese Patent Application No. 201811430791.6 issued by the Chinese Patent Office dated Oct. 17, 2023.

* cited by examiner

MEMORY SYSTEM AND OPERATING METHOD THEREOF

CROSS-REFERENCE TO RELATED APPLICATION

This application is a continuation of U.S. patent application Ser. No. 16/872,638 filed on May 12, 2020 and issued as U.S. Pat. No. 11,379,364 on Apr. 5, 2022, which is a continuation of U.S. patent application Ser. No. 16/156,730 filed on Oct. 10, 2018 and issued as U.S. Pat. No. 10,671,528 on Jun. 2, 2020, which claims benefits of priority of Korean Patent Application No. 10-2018-0036137 filed on Mar. 28, 2018. The disclosure of each of the foregoing application is incorporated herein by reference in its entirety.

BACKGROUND

1. Field

Various embodiments of the present invention generally relate to a memory system. Particularly, the embodiments relate to a memory system which processes data with respect to a memory device, and an operating method thereof.

2. Discussion of the Related Art

The computer environment paradigm has shifted to ubiquitous computing in which computer systems can be used anytime and anywhere. As a result, use of portable electronic devices such as mobile phones, digital cameras, and notebook computers has rapidly increased. These portable electronic devices generally use a memory system having one or more memory devices for storing data. A memory system may be used as a main memory or an auxiliary memory of a portable electronic device.

Such memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Various embodiments are directed to a memory system and an operating method thereof, capable of minimizing complexity and performance deterioration of a memory system and maximizing use efficiency of a memory device, thereby quickly and stably processing data with respect to the memory device.

In accordance with an embodiment of the present invention, a memory system may comprise: a memory device including a plurality of memory dies; and a controller including a first memory, Wherein the controller may store data segments of user data, corresponding to a plurality of commands received from a host, in the first memory, controls the memory device to sequentially store the data segments in the memory dies through interleaving, may update map segments of map data corresponding to storage of the data segments in the memory dies, may store the map segments in the first memory, controls the memory device to store the map segments stored in the first memory in the memory dies, and may assist the host in storing the map segments, stored in the first memory, in a second memory in the host.

The controller may store a first data segment group of the data segments in the first memory and controls the memory device to store the first data segment group in the memory dies through interleaving, in a first cycle, and may store a second data segment group of the data segments in the first memory and controls the memory device to store the second data segment group in the memory dies, through interleaving, in a second cycle following the first cycle.

The controller may update a first map segment group of the map segments corresponding to storage of the first data segment group in the memory dies, may store the first map segment group in the first memory, and may assist the host in storing first map segments in the first map segment group in the second memory.

The controller may update a second map segment group of the map segments corresponding to storage of the second data segment group in the memory dies by referring to the first map segments, may store the second map segment group in the first memory, may assist the host in discarding the first map segments stored in the second memory, and controls the memory device to store map segment groups stored in the first memory in the memory des.

In the case where the first map segments may exist in the first memory, the controller may update the second map segment group by referring to the first map segments in the first memory.

In the case where the first map segments do not may exist in the first memory, the controller may update the second map segment group by referring to the first map segments stored in the second memory.

The first map segments may be at least one of: map segments among map segments which may be updated last, map segments which may have a largest size, and map segments which may have a largest overload.

The commands may have a sequential pattern, and the user data and the map data may be sequential data.

The controller may update the map segments as the map data in which start position information and size information may be included, and controls the memory device to store the updated map data in the memory dies.

The controller controls the memory device to store the data segments and the map segments in the memory dies through at least one of channel interleaving, way interleaving, and memory die interleaving.

In accordance with an embodiment of the present invention, a method for operating a memory system, may comprise: receiving a plurality of commands from a host, for a memory device including a plurality of memory dies; storing data segments of user data, corresponding to the commands, in a first memory included in a controller of the memory device, and sequentially storing the data segments in the memory dies through interleaving; updating map segments of map data corresponding to storage of the data segments in the memory dies, and storing the map segments in the first memory; and storing the map segments, stored in the first memory, in the memory dies and a second memory included in the host.

The storing of the data segments in the memory dies may comprise: storing a first data segment group of the data segments in the first memory and storing the first data segment group in the memory dies through interleaving, in a first cycle; and storing a second data segment group in the first memory and storing the second data segment group in the memory dies through interleaving, in a second cycle following the first cycle.

The storing of the map segments in the first memory may comprise updating a first map segment group of the map segments corresponding to storage of the first data segment group in the memory dies, and storing the first map segment group in the first memory, and the storing of the map segments in the second memory may comprise storing first map segments in the first map segment group in the second memory.

The storing of the map segments in the first memory may comprise: updating a second map segment group of the map segments corresponding to storage of the second data segment group in the memory dies by referring to the first map segments, and storing the second map segment group in the first memory; discarding the first map segments stored in the second memory; and storing map segment groups, stored in the first memory, in the memory dies.

The storing of the map segments in the first memory may comprise updating the second map segment group by referring to the first map segments in the first memory.

The storing of the map segments in the first memory may comprise updating the second map segment group by referring to the first map segments stored in the second memory.

The first map segments may be at least one of: map segments among map segments which may be updated last, map segments which may have a largest size and map segments which may have a largest overload.

The commands may have a sequential pattern, and the user data and the map data may be sequential data.

The method may further comprise updating the map segments as the map data in which start position information and size information may be included, and storing the updated map data in the memory des.

The method may further comprise: storing the data segments and the map segments in the memory dies through at least one of channel interleaving, way interleaving, and memory die interleaving.

In accordance with an embodiment of the present invention, a data processing system may comprise: a host including a first memory and configured to provide first and second write requests respectively for first and second sequential data; a memory device including memory dies; and a controller including a second memory storing map data and configured to: control the memory device to store the first sequential data in the memory dies in a sequential order during a first cycle in response to the first write request; update the map data for the first data during the first cycle; assist the host to store a portion of the updated map data in the first memory during the first cycle; control the memory device to store the second sequential data in the memory dies in the sequential order during a second cycle in response to the second write request; update the map data for both the first and second sequential data during the second cycle by referring to the map data stored in one of the first and second memories; and assist the host in storing a portion of the updated map data in the first memory during the second cycle.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
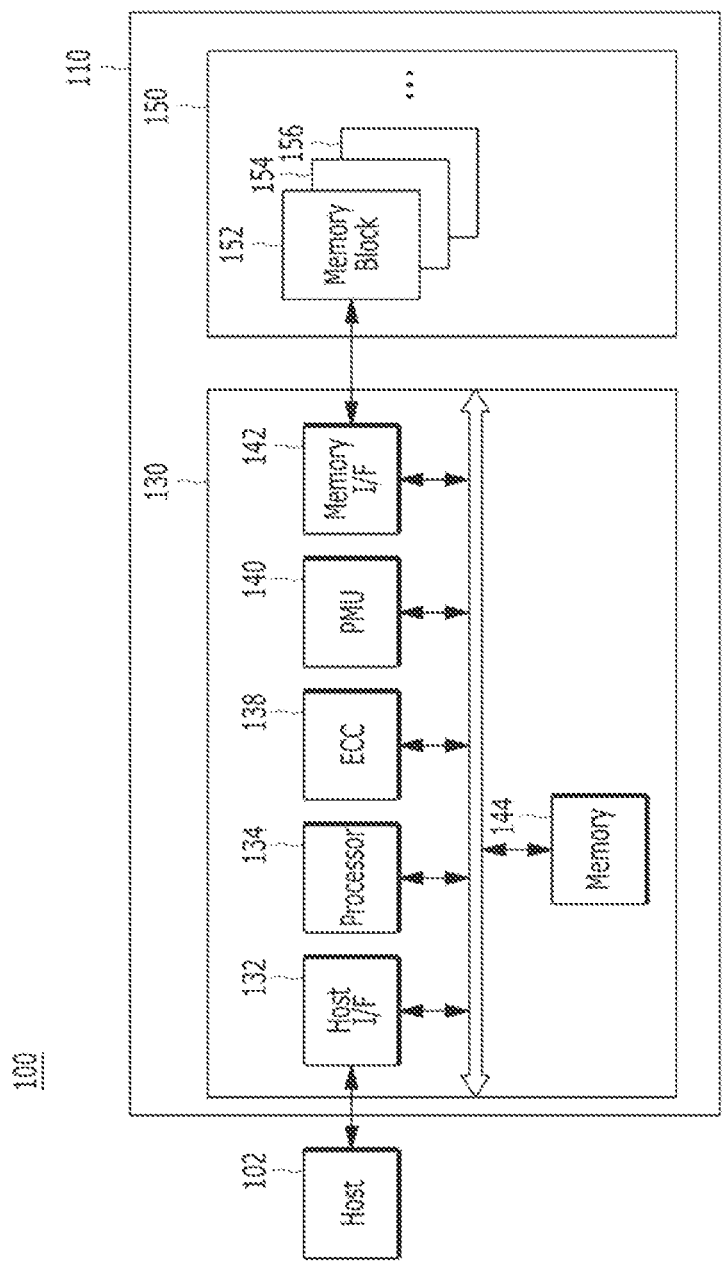
FIG. 1 is a block diagram illustrating a data processing system including a memory system, in accordance with an embodiment of the present invention.

Various embodiments of the present invention will be described below in more detail with reference to the accompanying drawings. The present invention may, however, be embodied in different forms and thus should not be construed as limited to the embodiments set forth herein. Rather, these embodiments are provided so that this disclosure is thorough and complete and fully, conveys the scope of the present invention to those skilled in the art. Throughout the disclosure, like reference numerals refer to like parts throughout the various figures and embodiments of the present invention.

Various embodiments of the present invention are described below in more detail with reference to the accompanying drawings. We note, however, that the present invention may be embodied in different other embodiments, forms and variations thereof and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention. Also, throughout the specification, reference to "an embodiment," "another embodiment," or the like is not necessarily to only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present, in addition, it will also be understood that when an element is referred to as being "between" two elements, it may be the only element between the two elements, or one or more intervening elements may also be present. Communication between two elements, whether directly or indirectly coupled, may be wired or wireless, unless the context indicates otherwise.

The terminology used herein is for the purpose of describing particular embodiments and is not intended to be limiting of the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 and the memory system 110, FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system), which may manage and control overall functions and operations of the host 102. The OS may support an operation between the host 102 and a user using the data processing system 100 or the memory system 110. The OS may support functions and operations requested by a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix.

Furthermore, the mobile OS may be configured to support a function of providing a mobile service to users, and a power saving function of a system may include Android, iOS and Windows Mobile. The host 102 may include a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request.

The memory system 110 may store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and micro-MMC. The SD card may include a mini-SD card and micro-SD card.

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in any of the various types of memory systems as described above. For example, the controller 130 and the memory device 150 may be integrated as a single semiconductor device to constitute an SSD. When the memory system 110 is used as an SSD, the operating speed of the host 102 connected to the memory system 110 can be improved. In another example, the controller 130 and the memory device 150 may be integrated as a single semiconductor device to constitute a memory card such as a PCMCIA (personal computer memory card international association) card, a CF card, a SMC (smart media card), memory stick, a MMC including a RS-MMC and a micro-MMC, SD card including a mini-SD, a micro-SD and a SDHC, or an UFS device.

Non-limiting applications of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), and each memory die may include a plurality of planes (not shown). Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The structure of the memory device 150 and the 3D stack structure of the memory device 150 will be described in detail below with reference to FIGS. 2 to 4. The memory device 150 including a plurality of memory dies, each of which includes a plurality of planes, each of which includes memory blocks, such as the plurality of memory blocks 152 to 156, will be described in detail below with reference to FIG. 6. Thus, further description thereof is omitted here.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

More specifically, the controller 130 may include a host interface (I/F) 132, a processor 134, an error correction code (ECC) component 138, a Power Management Unit (PMU) 140, a memory interface 142, and a memory 144, all operatively coupled or engaged via an internal bus.

The host interface 132 may process a command and data of the host 102. The host interface 132 may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (DATA), enhanced small disk interface (ESDI) and integrated drive electronics (IDE). The host interface 132 may be driven via firmware, that is, a host interface layer (HIL) for exchanging data with the host 102.

Further, the ECC component 138 may correct error bits of data to be processed by the memory device 150 and may include an ECC encoder and an ECC decoder. The ECC encoder may perform error correction encoding on data to be programmed into the memory device 150 to generate data to which a parity bit is added. The data including the parity bit may be stored in the memory device 150. The ECC decoder may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is more than a threshold value of correctable error bits, the ECC component 138 may not correct the error bits, and instead may output the error correction fail signal.

The ECC component 138 may perform error correction through a coded modulation such as a Low Density Parity Check (LDPC) code, a Bose-Chaudhri-Hocquenghem (BCH) code, a turbo code, a Reed-Solomon code, a convolution code, a Recursive Systematic Code (RSC), a Trellis-Coded Modulation (TCM) and a Block coded modulation (BCM). However, the ECC component 138 is not limited to these error correction techniques. As such, the ECC unit 138 may include any and all circuits, modules, systems or devices for performing suitable error correction.

The PMU 140 may manage electrical power used and provided in the controller 130.

The memory interface 142 may serve as a memory/storage interface between the controller 130 and the memory device 150 such that the controller 130 may control the memory device 150 in response to a request from the host 102. When the memory device 150 is a flash memory or specifically a NAND flash memory, the memory interface 142 may be NAND flash controller (NFC) and may generate a control signal for the memory device 150 and perform a data process. The memory interface 142 may provide data for the memory device 150 under the control of the processor 134. The memory interface 142 may work as an interface (e.g., a NAND flash interface) for handling a command and data between the controller 130 and the memory device 150. Specifically, the memory interface 142 may support data transmission between the controller 130 and the memory device 150. The memory interface 142 may use firmware, that is, a flash interface layer (FIL) for exchanging data with the memory device 150.

The memory 144 may serve as a working memory of the memory system 110 and the controller 130, and store data for driving the memory system 110 and the controller 130. The controller 130 may control the memory device 150 to perform read, program, and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. In an embodiment, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150 and other data required for the controller 130 and the memory device 150 to perform these operations.

The processor 134 may control overall operations of the memory system 110. Specially, the processor 134 controls a program operation or a read operation for the memory device 150 in response to a write request or a read request from the host 102. The processor 134 may use firmware to control the overall operations of the memory system 110. The firmware may be referred to as flash translation layer (FTL). The controller 130 may be implemented as a microprocessor, a CPU, or the like.

For example, the controller 130 may perform an operation requested by the host 102 in the memory device 150 through the processor 134, which is implemented as a microprocessor, a CPU, or the like. In other words, the controller 130 may perform a command operation corresponding to a command entered from the host 102. Herein, the controller 130 may perform a foreground operation as the command operation corresponding to the command entered from the host 102. For example, the foreground operation may include a program operation corresponding to a write command, a read operation corresponding to a read command, an erase operation corresponding to an erase command, and a parameter set operation corresponding to a set parameter command, or a set feature command as a set command. Also, the controller 130 may perform a background operation on the memory device 150 through the processor 134, which may be realized as a microprocessor or a CPU. The background operation performed on the memory device 150 may include an operation of copying and processing data stored in some memory blocks of the memory device 150 into other memory blocks, e.g., a garbage collection (GC) operation, an operation of performing swapping between the memory blocks 152 to 156 or between the data of the memory blocks 152 to 156, e.g., a wear-leveling (WL) operation, an operation of storing the map data stored in the controller 130 in the memory blocks 152 to 156, e.g., a map flush operation, or an operation of managing bad blocks of the memory device 150, e.g., a bad block management operation of detecting and processing bad blocks among the memory blocks 152 to 156 in the memory device 150.

In the memory system according to an embodiment of the present invention, the controller 130 performs a plurality of command operations corresponding to the plurality of commands received from the host 102 in the memory device 150. For example, the controller 130 performs a plurality of program operations corresponding to a plurality of write commands, a plurality of read operations corresponding to a plurality of read commands and a plurality of erase operations corresponding to a plurality of erase commands and performs a map update operation and a map flush operation on meta data, particularly map data, corresponding to execution of the command operations in the memory device 150.

In the memory system according to an embodiment of the present invention, when the controller 130 performs the command operations corresponding to the plurality of commands received from the host 102, such as program operations, read operations, and erase operations in a plurality of memory dies in the memory device 150, a map update operation and a map flush operation corresponding to the command operations performed in each of the plurality of memory dies are performed. In particular, when the data corresponding to the commands is sequential data, the controller 130 performs a map update operation and a map flush operation corresponding to the sequential program operation and the sequential read operation after the controller 130 performs a sequential program operation and a sequential read operation. The controller 130 performs a sequential command operation when the pattern of commands received from the host 102 is a sequential pattern. More specifically, the controller 130 performs a sequential program operation when the pattern of the write commands received from the host 102 is a sequential write pattern, and the controller 130 performs a sequential read operation when the pattern of the read commands received from the host 102 is a sequential read pattern.

In the memory system according to an embodiment of the present invention, the memory device 150 includes a plurality of channels and a plurality of memory dies connected to a plurality of ways. When the controller 130 performs command operations on the memory dies, the controller 130 performs the command operations in consideration of channel interleaving, way interleaving, and memory die interleaving. The controller 130 performs a map update operation and a map flush operation in accordance with the command operations performed in each of the plurality of memory dies. In particular, when the data corresponding to the commands is sequential data, the controller 130 performs a map update operation and a map flush operation corresponding to sequential program operation and sequential read operation after the controller 130 performs sequential program operation and sequential read operation in consideration of interleaving in the memory dies of the memory device 150. Further description of performing command operations with interleaving for the memory dies of memory device 150 and a map update operation and a map flush operation corresponding to the execution of the command operations is omitted here, because it is described more specifically with reference to FIGS. 5 to 10.

The processor 134 of the controller 130 may include a management unit (not illustrated) for performing a bad management operation of the memory device 150. The management unit may perform a bad block management operation of checking for a bad block, in which a program fail occurs due to the characteristic of a NAND flash memory during a program operation, among the plurality of memory blocks 152 to 156. The management unit may write the program-failed data of the bad block to a new memory block. In the memory device 150 having a 3D stack structure, the bad block management operation may reduce the use efficiency of the memory device 150 and the reliability of the memory system 110. Thus, the bad block management operation performing with more reliability is needed.

The memory device of the memory system in accordance with an embodiment of the present invention is described in detail with reference to FIGS. 2 to 4.

Figure 2:
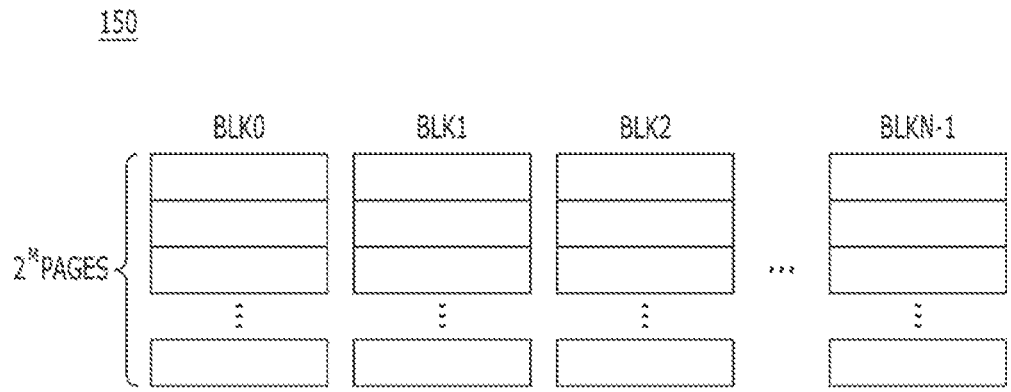
FIG. 2 is a schematic diagram illustrating an exemplary configuration of a memory device employed in the memory system shown in FIG. 1.

FIG. 2 is a schematic diagram illustrating the memory device 150. FIG. 3 is a circuit diagram illustrating an exemplary configuration of a memory cell array of a memory, block 330 in the memory device 150. FIG. 4 is a schematic diagram illustrating an exemplary 3D structure of the memory device 150.

Referring to FIG. 2, the memory device 150 may include a plurality of memory, blocks BLOCK0 to BLOCKN−1, where N is an integer greater than 1. Each of the blocks BLOCK0 to BLOCKN−1 may include a plurality of pages, for example, $2^M$ or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN−1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher data durability than the MCL memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may implemented by any one of a phase change random access memory (PCRAM), a resistive random access memory (RRAM (ReRAM)), a ferroelectrics random access memory (FRAM), and a spin transfer torque magnetic random access memory (STT-RAM (STT-MRAM)).

The memory blocks may store the data transferred from the host 102 through a program operation, and may transfer data stored therein to the host 102 through a read operation.

Figure 3:
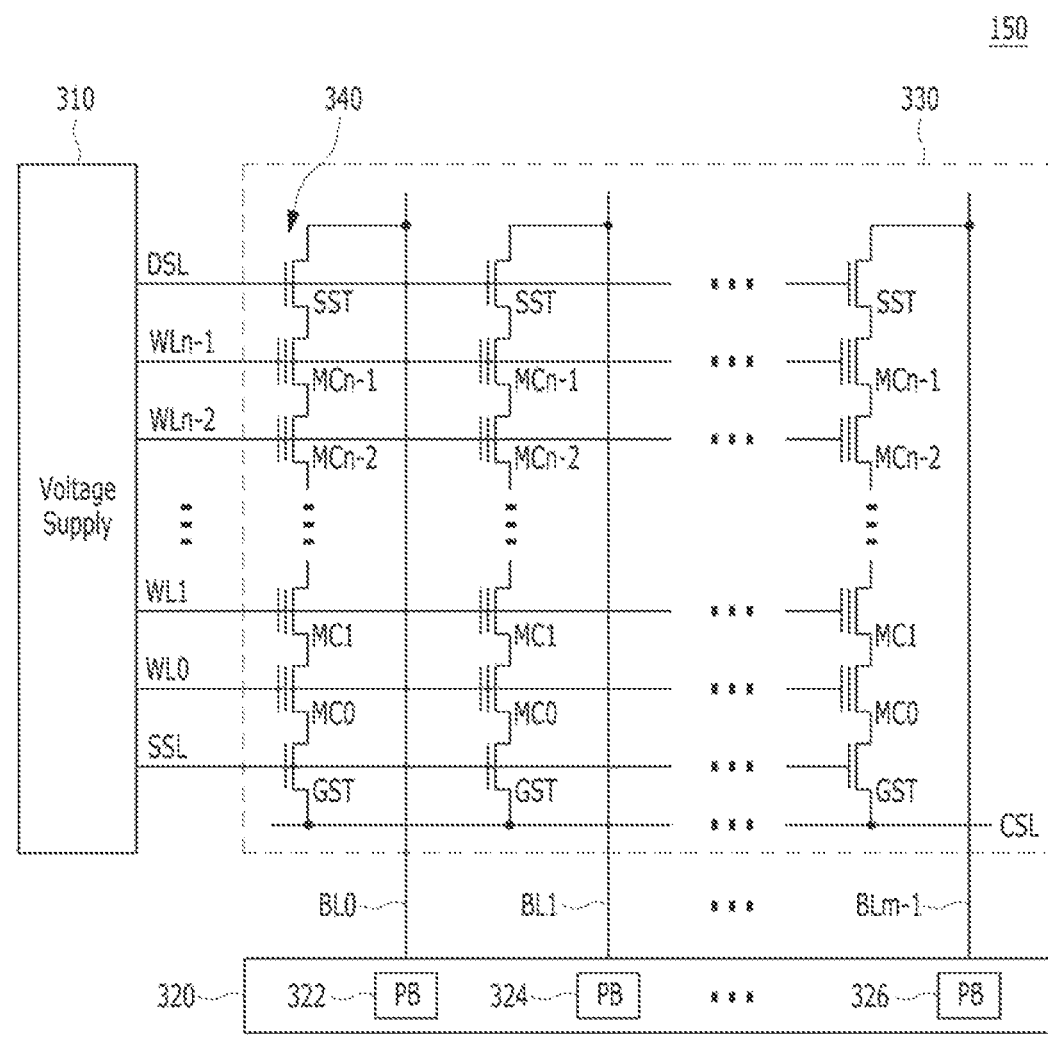
FIG. 3 is a circuit diagram illustrating an exemplary configuration of a memory cell array of a memory block in the memory device shown in FIG. 2.
Figure 4:
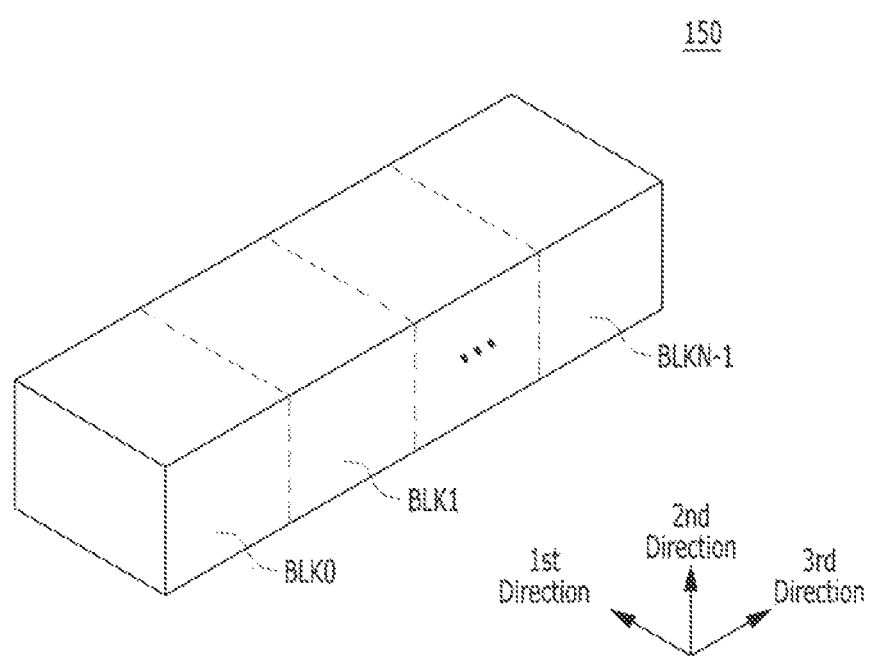
FIG. 4 is a schematic diagram illustrating an exemplary three-dimensional structure of the memory device shown in FIG. 2.

Referring to FIG. 3, the memory block 330 may include a plurality of cell strings 340 coupled to a plurality of corresponding bit ones BL0 to BLm−1. The cell string 340 of each column may include one or more drain select transistors DST and one or more source select transistors SST. Between the drain and source select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of the control circuit, the voltage supply 310 may select at least one of the memory blocks (or sectors) of the memory cell array, select at least one of the word ones of the selected memory block, and provide the word line voltages to the selected word line(s) and the unselected word lines as may be needed.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit ones according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a 2D or 3D memory device. Particularly, as illustrated in FIG. 4, the memory device 150 may be embodied by a nonvolatile memory device having a 3D stack structure. When embodied as a 3D structure, the memory device 150 may include a plurality of memory blocks BLK0 to BLKN−1. FIG. 4 is a block diagram illustrating the memory blocks 152, 154 and 156 of the memory device 150 shown in FIG. 1. Each of the memory blocks 152, 154 and 156 may be realized in a 3D structure (or vertical structure). For example, the memory blocks 152, 154 and 156 may include three-dimensional structures, dimensions of which extend in first to third directions, e.g., an x-axis direction, a y-axis direction, and a z-axis direction.

Each memory block 330 in the memory device 150 may include a plurality of NAND strings that extend in the second direction, and a plurality of NAND strings that extend in the first direction and the third direction. Each of the NAND strings may be coupled to a bit line BL, at least one string selection line SSL, at least one ground selection line GSL, a plurality of word ones WL, at least one dummy word line DWL, and a common source line CSL. Each of the NAND strings may include a plurality of transistor structures.

In short, each memory block 330, among the memory blocks 152, 154 and 156 of the memory device 150, may be coupled to a plurality of bit lines BL, a plurality of string selection lines SSL, a plurality of ground selection lines GSL, a plurality of word lines WL, a plurality of dummy word lines DWL, and a plurality of common source lines CSL, and each memory block 330 may include a plurality of NAND strings. Also, in each memory block 330, one bit line BL may be coupled to a plurality of NAND strings to realize a plurality of transistors in one NAND string. Also, a string selection transistor SST of each NAND string may be coupled to a corresponding bit line BL, and a ground selection transistor GST of each NAND string may be coupled to a common source line CSL. Herein, memory cells MC may be provided between the string selection transistor SST and the ground selection transistor GST of each NAND string. In other words, a plurality of memory cells may be realized in each memory block 330 of the memory device 150.

In the memory system in accordance with an embodiment of the present disclosure, the controller 130 performs command operations corresponding to a plurality of commands received from the host 102, in the memory device 150. For example, the controller 130 performs a plurality of program operations, a plurality of read operations corresponding to a plurality of read commands and a plurality of erase operations corresponding to a plurality of erase commands corresponding to a plurality of write commands received from the host 102, in the memory device 150. A map update operation and a map flush operation for a map data of a meta data in correspondence to performing of the command operations are performed.

In the case where the controller 130 performs command operations corresponding to commands received from the host 102, for example, program operations, read operations and erase operations in the memory dies in the memory device 150, a map update operation and a map flush operation in correspondence to the respective command operations is performed in the plurality of memory dies.

With reference to FIGS. 5 to 9, a data processing operation with respect to the memory device 150 in the memory system in accordance with an embodiment, particularly, a data processing operation of performing, in the memory device 150, command operations corresponding to a plurality of commands received from the host 102, is described.

FIGS. 5 to 9 are schematic diagrams illustrating a data processing operation in the case of performing a foreground operation and a background operation for a memory device in a memory system in accordance with an embodiment. By way of example, a case is described in which foreground operations for the memory device 150, e.g., a plurality of command operations corresponding to a plurality of commands received from the host 102, are performed, and background operations for the memory device 150, e.g., a garbage collection operation or a read reclaim operation as a copy operation, a wear leveling operation as a swap operation or a map update operation and a map flush operation, are performed. In particular, in the illustrated embodiment, the data processing operation entails receiving a plurality of write commands from the host 102 and performing program operations corresponding to the write commands, receiving a plurality of read commands from the host 102 and performing read operations corresponding to the read commands, receiving a plurality of erase commands from the host 102 and performing erase operations corresponding to the erase commands, or receiving a plurality of write commands and a plurality of read commands together from the host 102 and performing program operations and read operations corresponding to the write commands and the read commands.

Moreover, as an example, after storing write data corresponding to a plurality of write commands received from the host 102 in the buffer/cache in the memory 144 of the controller 130, the stored write data stored are programmed to and stored in the plurality of memory blocks, and, after updating map data in correspondence to the storing of the write data in the plurality of memory blocks, the updated map data are stored in the plurality of memory blocks. That is to say, program operations corresponding to a plurality of write commands received from the host 102 are performed. Furthermore, when a plurality of read commands are received from the host 102 for the data stored in the memory device 150, data corresponding to the read commands are read from the memory device 150 by checking the map data of the data corresponding to the read commands, and, after storing the read data in the buffer/cache included in the memory 144 of the controller 130, the data stored in the buffer/cache are provided to the host 102. In other words, read operations corresponding to a plurality of read commands received from the host 102 are performed. In addition, when a plurality of erase commands are received from the host 102 for the memory blocks included in the memory device 150, after checking memory blocks corresponding to the erase commands, the data stored in the checked memory blocks are erased, and, after updating map data in correspondence to the erased data, the updated map data are stored in the plurality of memory blocks included in the memory device 150. Namely, erase operations corresponding to a plurality of erase commands received from the host 102 are performed.

Further, while it is described that the controller 130 performs command operations in the memory system 110, the present invention is not limited to this configuration; rather, the processor 134 in the controller 130 may perform command operations in the memory system 110, through, for example, an FTL (flash translation layer) Also, in an embodiment of the present disclosure, the controller 130 programs and stores user data and metadata, corresponding to write commands received from the host 102, in arbitrary memory blocks among the plurality of memory blocks in the memory device 150, reads user data and metadata corresponding to read commands received from the host 102, from arbitrary memory blocks, and provides the read data to the host 102, or erases user data and metadata, corresponding to erase commands received from the host 102, from arbitrary memory blocks. However, one or more other components may perform these operations.

Metadata may include first map data including logical/physical (L2P: logical to physical) information (hereinafter, referred to as a 'logical information') and second map data including physical/logical (P2L: physical to logical) information (hereinafter, referred to as a 'physical information'), for data stored in memory blocks in correspondence to a program operation. Also, the metadata may include information on command data corresponding to a command received from the host 102, information on a command operation corresponding to the command, information on the memory blocks of the memory device 150 for which the command operation is to be performed, and information on map data corresponding to the command operation. In other words, metadata may include all remaining information and data, excluding user data, corresponding to a command received from the host 102.

That is, in an embodiment of the present disclosure, in the case where the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are received from the host 102, the controller 130 writes and stores user data corresponding to the write commands in memory blocks, and stores, in memory blocks, metadata including first map data and second map data for the user data stored in the memory blocks.

In particular, in correspondence to the data segments of the user data being stored in the memory blocks of the memory device 150, the controller 130 generates and updates the L2P segments of first map data and the P2L segments of second map data as the map segments of map data among the meta segments of metadata, and then, stores them in the memory blocks of the memory device 150. The map segments stored in the memory blocks are loaded in the memory 144 in the controller 130 and are then updated.

Further, in the case where a plurality of read commands are received from the host 102, the controller 130 reads read data corresponding to the read commands from the memory device 150, stores the read data in the buffers/caches in the memory 144 of the controller 130, and then, provides the data stored in the buffers/caches to the host 102, by which read operations corresponding to the plurality of read commands are performed.

In addition, in the case where a plurality of erase commands are received from the host 102, the controller 130 checks memory blocks of the memory device 150 corresponding to the erase commands, and then, performs erase operations for the memory blocks.

As command operations corresponding to a plurality of commands received from the host 102 are performed, in the case where a background operation, for example, a garbage collection operation or a read reclaim operation as a copy operation, a wear leveling operation as a swap operation or a map update operation and a map flush operation, is performed, the controller 130 loads and stores data corresponding to the background operation, that is, metadata and user data, in the buffer/cache in the memory 144 of the controller 130, and then stores the data, that is, the metadata and the user data, in the memory device 150. For instance, in the case of performing a background operation, the controller 130 checks for metadata and user data corresponding to the background operation in the memory blocks of the memory device 150, loads and stores the metadata and user data stored in certain memory blocks, in the buffer/cache in the memory 144 of the controller 130, and then stores the metadata and user data, in certain other memory blocks of the memory device 150.

In particular, in the memory system in accordance with an embodiment of the present disclosure, the memory device 150 includes a plurality of memory dies which are coupled to a plurality of channels and a plurality of ways. In the case where the controller 130 performs commands operations in the memory dies of the memory device 150, the command operations are performed in consideration of channel interleaving, way interleaving and memory the interleaving, and a map update operation and map flush operations are performed in correspondence to the command operations in the plurality of memory dies. In particular, in the case where data corresponding to commands are sequential data, after performing sequential program operations and sequential read operations in the memory dies of the memory device 150 in consideration of interleaving, the controller 130 performs a map update operation and a map flush operation in correspondence to the sequential program operations and the sequential read operations. A data processing operation in the memory system in accordance with an embodiment of the present disclosure will be described in detail with reference to FIGS. 5 to 9.

Figure 5:
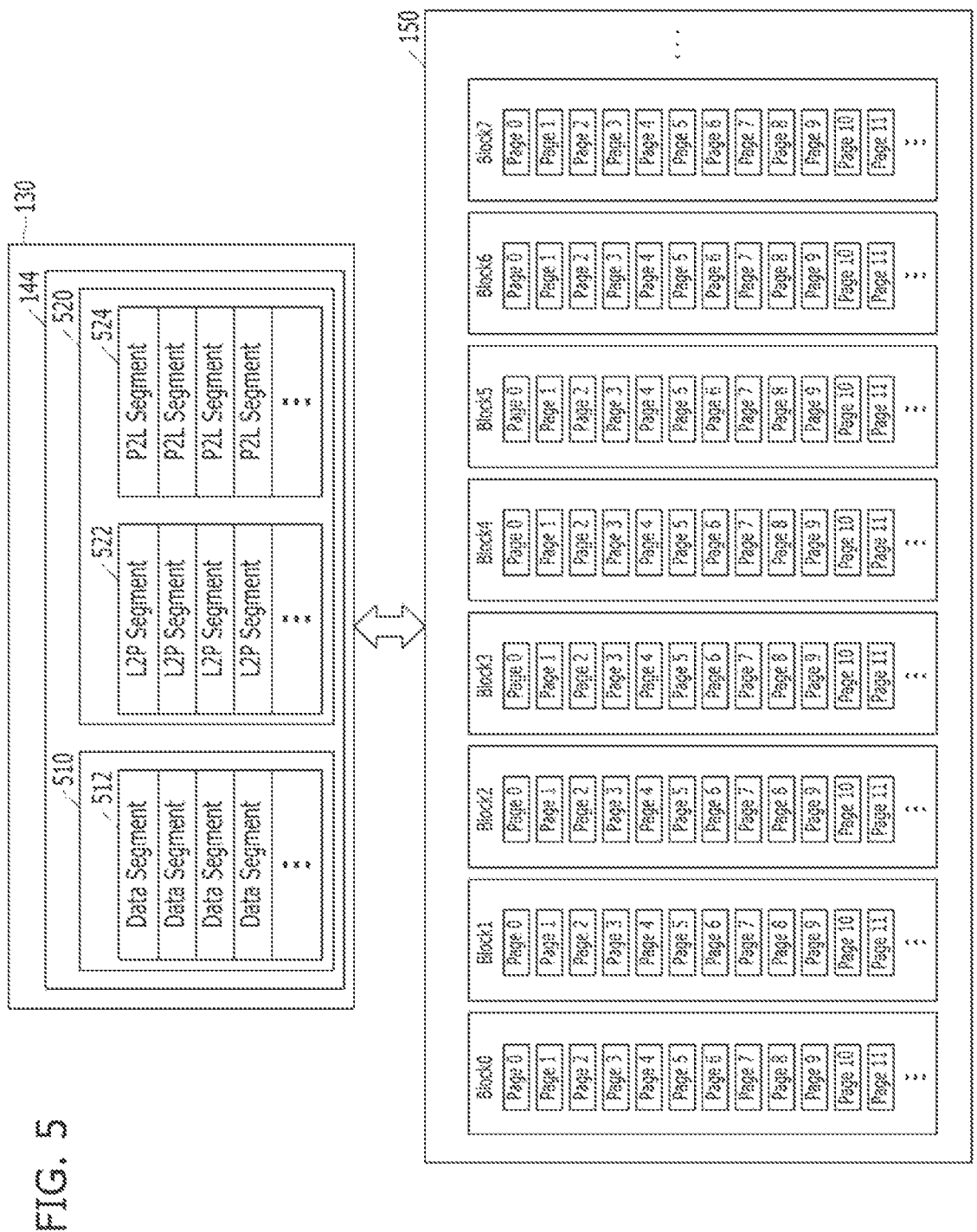
FIGS. 5 to 9 are schematic diagrams to assist in the explanation of a data processing operation in a memory system in accordance with an embodiment of the present invention.

First, referring to FIG. 5, the controller 130 performs command operations corresponding to a plurality of commands received from the host 102, for example, program operations corresponding to a plurality of write commands received from the host 102. The controller 130 programs and stores user data corresponding to the write commands in memory blocks of the memory device 150. Also, in correspondence to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages in the memory blocks of the memory device 150. That is to say, the controller 130 generates and updates L2P segments as the logical segments of the first map data and P2L segments as the physical segments of the second map data, and then stores them in pages in the memory blocks of the memory device 150.

For example, the controller 130 caches and buffers the user data corresponding to the write commands, received from the host 102, in a first buffer 510 in the memory 144 of the controller 130. In particular, after storing data segments 512 of the user data in the first buffer 510 as a data buffer/cache, the controller 130 stores the data segments 512, stored in the first buffer 510, in pages in the memory blocks of the memory device 150. As the data segments 512 of the user data corresponding to the write commands received from the host 102 are programmed to and stored in the pages in the memory blocks of the memory device 150, the controller 130 generates and updates the first map data and the second map data, and stores them in a second buffer 520 in the memory 144. In particular, the controller 130 stores L2P segments 522 of the first map data and P2L segments 524 of the second map data for the user data in the second buffer 520 as a map buffer/cache. In the second buffer 520, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 stores the L2P segments 522 of the first map data and the P2L segments 524 of the second map data, which are stored in the second buffer 520, in pages in the memory blocks of the memory device 150.

Also, the controller 130 performs command operations corresponding to a plurality of commands received from the host 102, for example, read operations corresponding to a plurality of read commands received from the host 102. In particular, the controller 130 loads L2P segments 522 of first map data and P2L segments 524 of second map data as the map segments of user data corresponding to the read commands, in the second buffer 520, and checks the L2P segments 522 and the P2L segments 524. After that, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands received from the host 102, for example, erase operations corresponding to a plurality of erase commands received from the host 102. In particular, the controller 130 checks memory blocks corresponding to the erase commands among the memory blocks of the memory device 150, and performs the erase operations for the checked memory blocks.

In the case of performing, as a background operation, an operation of copying data or swapping data among the memory blocks, for example, a garbage collection operation, a read reclaim operation or a wear leveling operation, the controller 130 stores data segments 512 of corresponding user data, in the first buffer 510, loads map segments 522 and 524 of map data corresponding to the user data, in the second buffer 520, and then performs the garbage collection operation, the read reclaim operation or the wear leveling operation. In the case of performing, as a background operation, a map update operation and a map flush operation for metadata, for example, map data, for the memory blocks of the memory device 150, the controller 130 loads the corresponding map segments 522 and 524 in the second buffer 520, and then performs the map update operation and the map flush operation.

In particular, in the case of performing program operations and read operations in the memory device 150, including a plurality of memory dies which are coupled to a plurality of channels and a plurality of ways as described above, the controller 130 performs program operations and read operations in consideration of channel interleaving, way interleaving and memory die interleaving, and, in correspondence to the command operations respectively performed in the plurality of memory dies, performs a map update operation and a map flush operation. In the case where data corresponding to commands are sequential data, after performing sequential program operations and sequential read operations in the memory dies of the memory device 150 in consideration of interleaving, the controller 130 performs a map update operation and a map flush operation in correspondence to the sequential program operations and the sequential read operations. The controller 130 stores sequential user data corresponding to the sequential program operations and the sequential read operations, in the first buffer 510 in the memory 144 of the controller 130, and stores sequential map data corresponding to the sequential program operations and the sequential read operations, in the second buffer 520 in the memory 144 of the controller 130.

Figure 6:
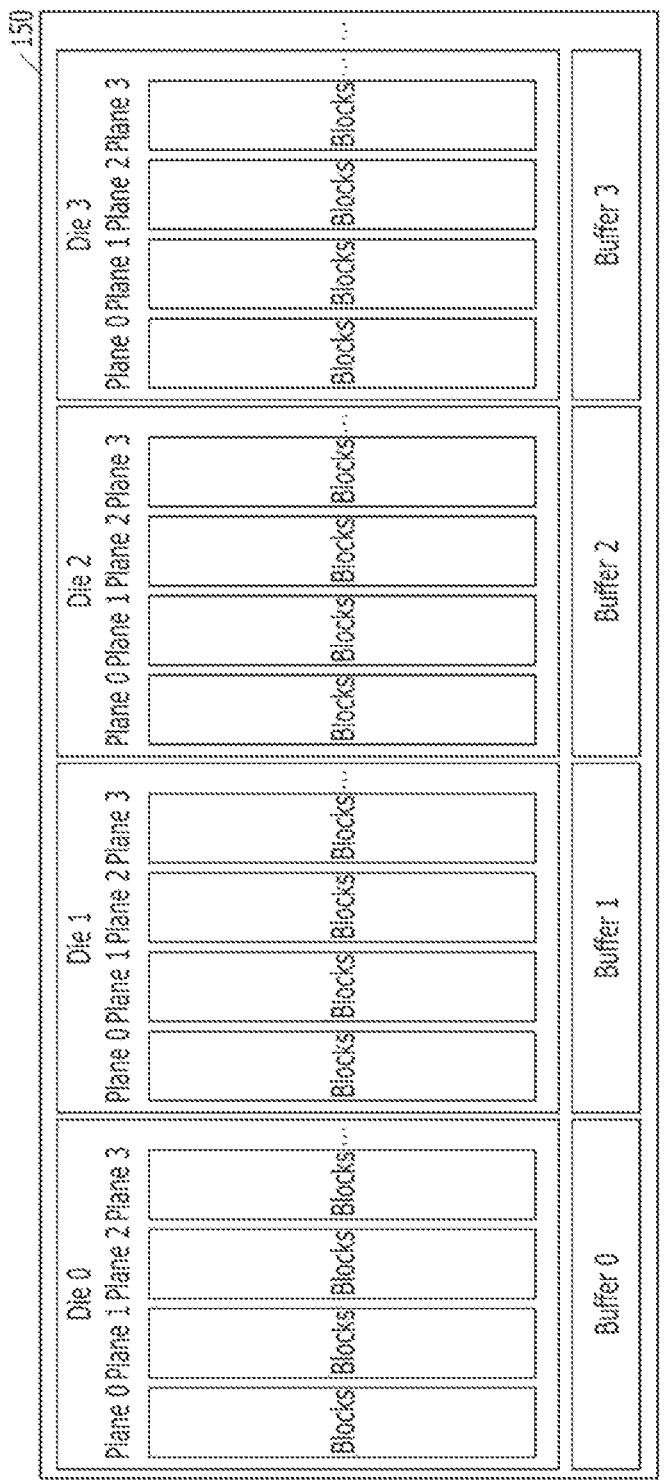

Referring to FIG. 6, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies include a plurality of memory blocks, for example, N blocks: Block0, Block1, . . . , BlockN−1. Each block includes a plurality of pages, for example, 2^M number of pages, as described above with reference to FIG. 2. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers. For example, in the case of performing program operations, data corresponding to the program operations are stored in the buffers, and are then stored in the pages in the memory blocks of the memory dies. In the case of performing read operations, data corresponding to the read operations are read from the pages in the memory blocks of the memory dies, are stored in the buffers, and are then provided to the host 102 through the controller 130.

It is noted that the buffers may be disposed within, or externally to, their respective dies. Further, it is noted that the buffers may be a plurality of caches or a plurality of registers included in the memory device 150.

Also, the plurality of memory blocks in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, in the case where the first memory bock group is included in the first plane of a certain first memory die, the second memory block group may be included in the first plane of the first memory die, in the second plane of the first memory die or the planes of a second memory die.)

Figure 7:
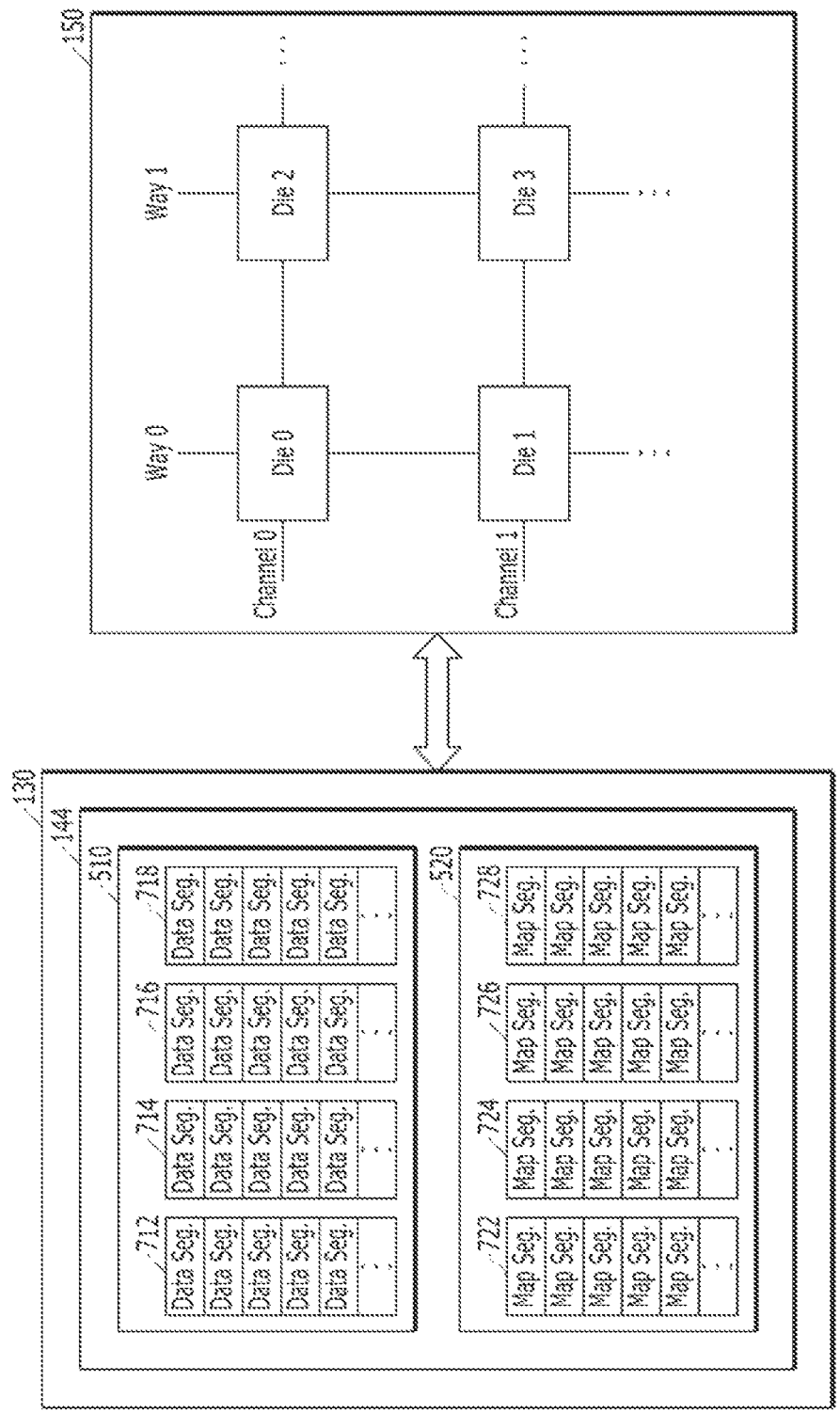
Figure 8:
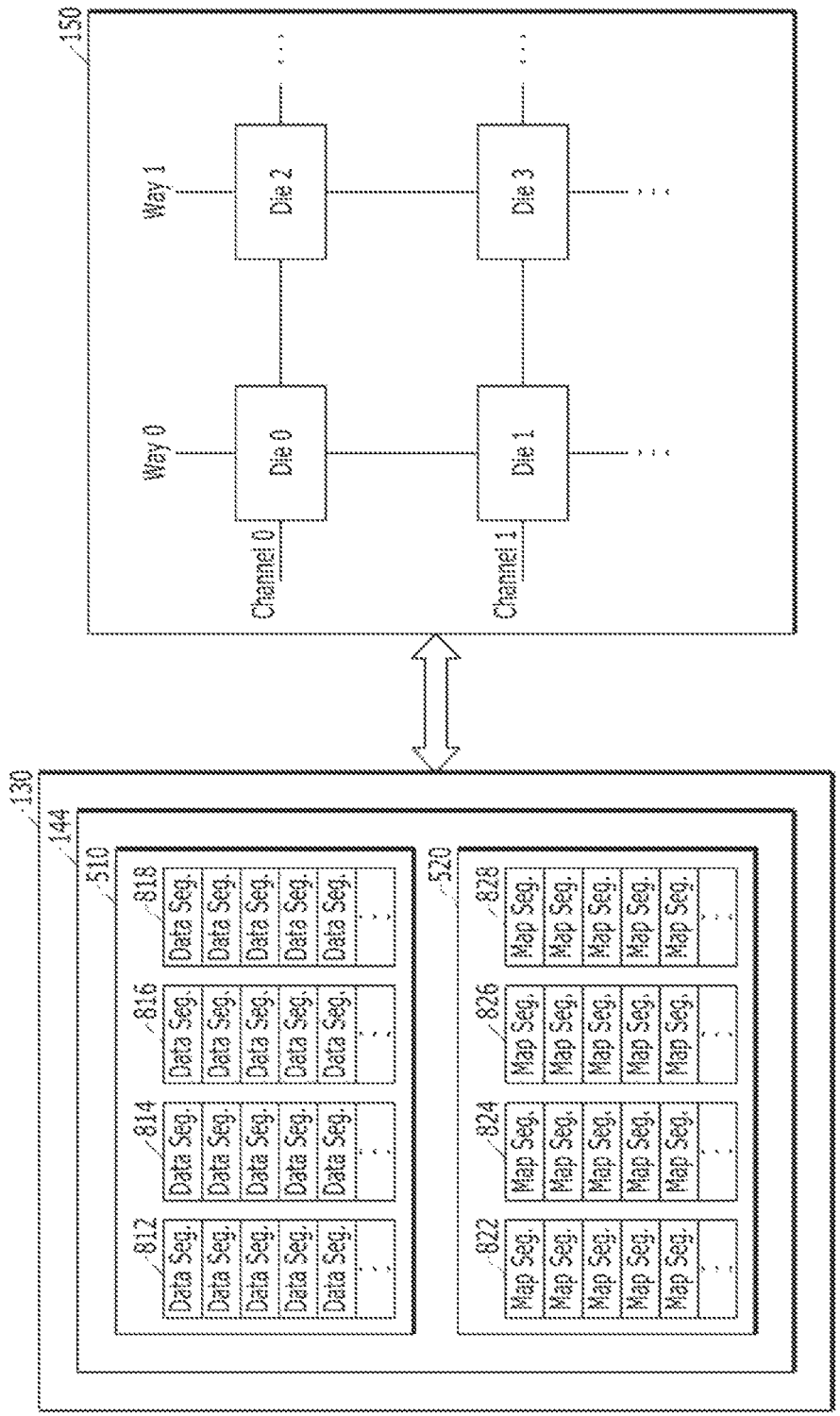
Figure 9:
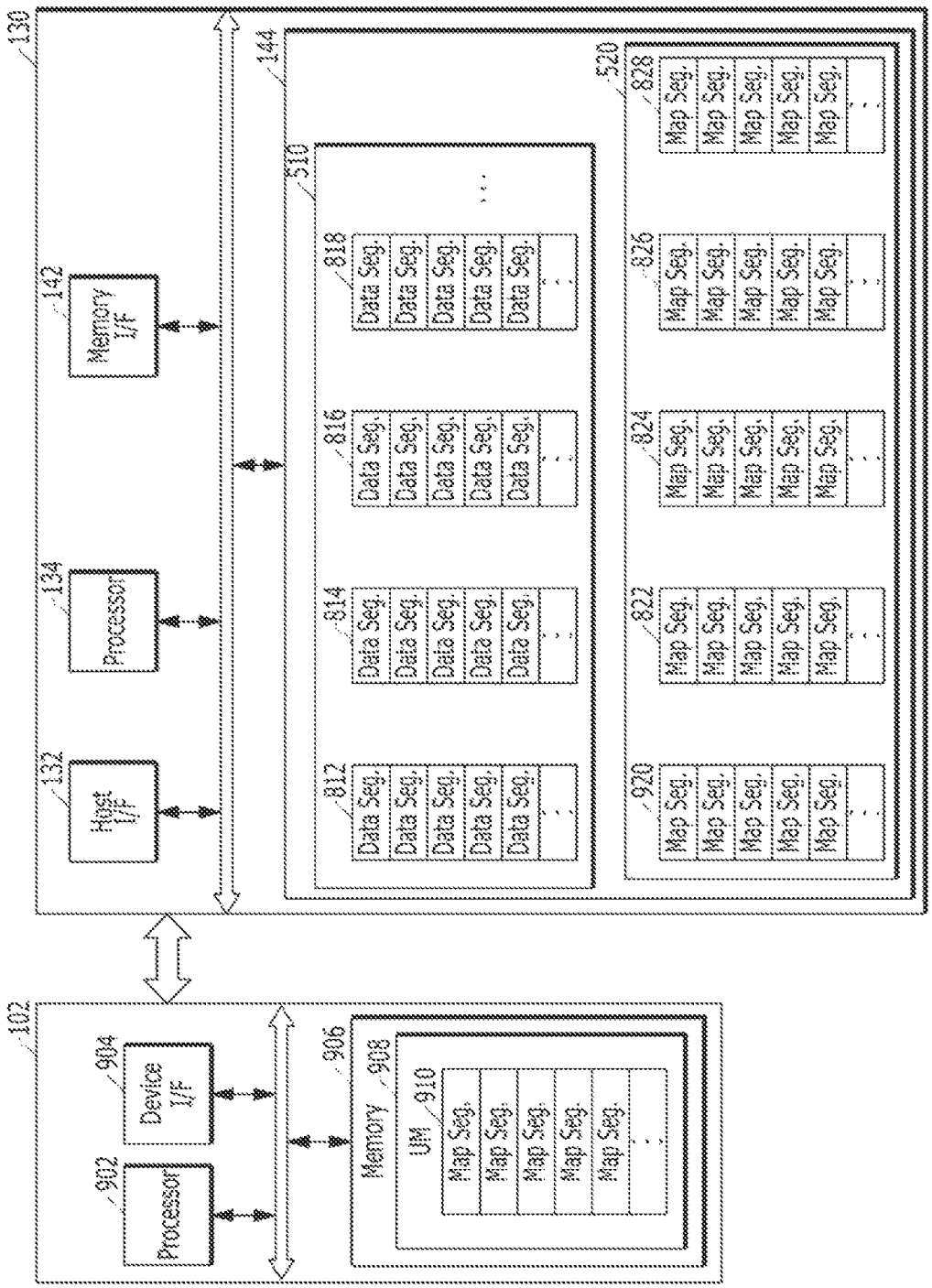

With reference to FIGS. 7 to 9, description is given for performing of program operations corresponding to a plurality of write commands received from the host 102 and read operations corresponding to a plurality of read commands received from the host 102, in the plurality of memory dies in the memory device 150, and for performing of a map update operation and a map flush operation in correspondence to performing of the program operations and the read operations, as described above, in the memory system in accordance with an embodiment of the present disclosure.

Referring to FIG. 7, in the case of receiving a plurality of commands, for example, write commands, read commands and/or erase commands, from the host 102, the controller 130 performs command operations corresponding to the plurality of commands received from the host 102, for example, program operations, read operations and erase operations, in the plurality of memory dies in the memory device 150. The plurality of memory dies are coupled to a plurality of channels and a plurality of ways, and the controller 130 performs the commands operations corresponding to the plurality of commands received from the host 102 in the plurality of memory dies in consideration of channel interleaving, way interleaving and memory die interleaving. In particular, the controller 130 performs program operations corresponding to a plurality of write commands in the memory dies of the memory device 150 in consideration of interleaving, performs read operations corresponding to a plurality of read commands in the memory dies of the memory device 150 in consideration of interleaving, and performs a map update operation and a map flush operation for map data in correspondence to performing of the program operations and the read operations in the memory dies of the memory device 150.

In detail, the controller 130 performs program operations corresponding to write commands received from the host 102, in the plurality of memory dies in the memory device 150, in consideration of channel interleaving, way interleaving and memory die interleaving. The controller 130 stores user data corresponding to the program operations, in the first buffer 510 in the memory 144 of the controller 130, and stores map data corresponding to the program operations, in the second buffer 520 in the memory 144 of the controller 130. The controller 130 performs read operations corresponding to read commands received from the host 102, in the plurality of memory dies in the memory device 150, in consideration of channel interleaving, way interleaving and memory die interleaving. The controller 130 stores user data corresponding to the read operations, in the first buffer 510 in the memory 144 of the controller 130, and stores map data corresponding to the read operations, in the second buffer 520 included in the memory 144 of the controller 130.

The memory device 150 includes the plurality of memory dies which are coupled to a plurality of channels and a plurality of ways, and index information on the channels and ways coupled to the respective memory dies are included in metadata and are then stored in the memory 144 of the controller 130 and the memory device 150. For example, among the memory dies included in the memory device 150, a memory die 0 is coupled to a channel 0 and a way 0, a memory die 1 is coupled to a channel 1 and the way 0, a memory die 2 is coupled to the channel 0 and a way 1, and a memory die 3 is coupled to the channel 1 and the way 1. Detailed description is given for program operations and read operations for the memory die 0, the memory die 1, the memory die 2 and the memory die 3 included in the memory device 150 and a map update operation and a map flush operation in correspondence to the program operations and the read operations.

In other words, in the case of receiving a plurality of write commands from the host 102, the controller 130 stores user data corresponding to the write commands, in the first buffer 510 included in the memory 144 of the controller 130, and programs and stores the user data stored in the first buffer 510, in the memory die 0, the memory die 1, the memory die 2 and the memory die 3 of the memory device 150. In correspondence to that the user data are stored in the memory die 0, the memory die 1, the memory die 2 and the memory die 3, the controller 130 stores map data in the second buffer 520 included in the memory 144 of the controller 130. As described above, first map data and second map data are stored in the second buffer 520. In particular, the map segments of the first map data and the second map data are stored in the second buffer 520.

In the case where user data corresponding to the write commands received from the host 102 are sequential user data, that is, in the case where a pattern of the write commands received from the host 102 is a sequential write pattern, the controller 130 stores data segments 712, 714, 716 and 718 corresponding to the sequential user data, in the first buffer 510. In the first buffer 520, first data segments 712, second data segments 714, third data segments 716 and fourth data segments 718 of the sequential user data are stored. The controller 130 stores the first data segments 712, the second data segments 714, the third data segments 716 and the fourth data segments 718 which are stored in the first buffer 510, in the memory dies of the memory device 150. The controller 130 stores the first data segments 712, the second data segments 714, the third data segments 716 and the fourth data segments 718 in the memory die 0, the memory die 1, the memory die 2 and the memory die 3, in consideration of channel interleaving, way interleaving and memory die interleaving. In an embodiment of the present disclosure, the controller 130 sequentially performs sequential program operations in the memory die 0, the memory die 1, the memory die 2 and the memory die 3 according to channel interleaving, way interleaving and memory die interleaving.

Namely, the controller 130 programs and stores the first data segments 712 stored in the first buffer 510 in the memory die 0 of the memory device 150, then programs and stores the second data segments 714 stored in the first buffer 510 in the memory die 1 of the memory device 150, then programs and stores the third data segments 716 stored in the first buffer 510 in the memory die 2 of the memory device 150, and then programs and stores the fourth data segments 718 stored in the first buffer 510 in the memory die 3 of the memory device 150. In correspondence to that the first data segments 712 are stored in the memory die 0, the controller 130 generates and updates first map segments 722, and then, flushes and stores the first map segments 722 in the memory dies of the memory device 150. In correspondence to that the second data segments 714 are stored in the memory die 1, the controller 130 generates and updates second map segments 724, and then, flushes and stores the second map segments 724 in the memory dies of the memory device 150. In correspondence to that the third data segments 716 are stored in the memory die 2, the controller 130 generates and updates third map segments 726, and then, flushes and stores the third map segments 726 in the memory dies of the memory device 150. In correspondence to that the fourth data segments 718 are stored in the memory die 3, the controller 130 generates and updates fourth map segments 728, and then, flushes and stores the fourth map segments 728 in the memory dies of the memory device 150. The map segments 722, 724, 726 and 728 which are generated and updated in correspondence to that the data segments 712, 714, 716 and 718 are stored in the memory dies of the memory device 150 are stored in the second buffer 520.

In particular, the controller 130 stores user data and map data corresponding to a plurality of write commands received from the host 102 in the memory dies of the memory device 150 as described above. In particular, in the case where the user data corresponding to the write commands received from the host 102 are sequential user data, in each cycle, the controller 130 programs and stores the data segments of the user data in the memory dies of the memory device 150, and generates and updates the map segments of the map data and flushes and stores the map segments in the memory dies of the memory device 150. For instance, in a first cycle, the controller 130 sequentially programs and stores the first data segments 712, the second data segments 714, the third data segments 716 and the fourth data segments 718, which are stored in the first buffer 510, in the memory die 0, the memory die 1, the memory die 2 and the memory die 3 of the memory device 150, and sequentially generates and updates the first map segments 722, the second map segments 724, the third map segments 726 and the fourth map segments 728 and then flushes and stores them in the memory dies of the memory device 150.

In a second cycle, which may be immediately after or following, the first cycle, the controller 130 programs and stores the data segments of user data in the memory dies of the memory device 150, and generates and updates the map segments of map data and then flushes and stores the map segments in the memory dies of the memory device 150.

That is to say, referring to FIG. 8, in the case where user data corresponding to write commands received from the host 102 are sequential user data, in the second cycle, the controller 130 stores data segments 812, 814, 816 and 818 corresponding to the sequential user data in the first buffer 510. In the first buffer 510, fifth data segments 812, sixth data segments 814, seventh data segments 816 and eighth data segments 818 of the sequential user data are stored. The controller 130 stores the fifth data segments 812, the sixth data segments 814, the seventh data segments 816 and the eighth data segments 818, which are stored in the first buffer 510, in the memory dies of the memory device 150. The controller 130 sequentially programs and stores the fifth data segments 812, the sixth data segments 814, the seventh data segments 816 and the eighth data segments 818 in the memory die 0, the memory die 1, the memory die 2 and the memory die 3, in consideration of channel interleaving, way interleaving and memory die interleaving.)

Namely, in the second cycle, the controller 130 programs and stores the fifth data segments 812 stored in the first buffer 510, in the memory die 0 of the memory device 150, then programs and stores the sixth data segments 814 stored in the first buffer 510, in the memory die 1 of the memory device 150, then programs and stores the seventh data segments 816 stored in the first buffer 510, in the memory die 2 of the memory device 150, and then programs and stores the eighth data segments 818 stored in the first buffer 510, in the memory die 3 of the memory device 150. In the second cycle, in correspondence to that the fifth data segments 812 are stored in the memory die 0, the controller 130 generates and updates fifth map segments 822, and then, flushes and stores the fifth map segments 822 in the memory dies of the memory device 150. In the second cycle, in correspondence to that the sixth data segments 814 are stored in the memory die 1, the controller 130 generates and updates sixth map segments 824, and then, flushes and stores the sixth map segments 824 in the memory dies of the memory device 150. In the second cycle, in correspondence to that the seventh data segments 816 are stored in the memory die 2, the controller 130 generates and updates seventh map segments 826, and then, flushes and stores the seventh map segments 826 in the memory dies of the memory device 150. In the second cycle, in correspondence to that the eighth data segments 818 are stored in the memory die 3, the controller 130 generates and updates eighth map segments 828, and then, flushes and stores the eighth map segments 828 in the memory dies of the memory device 150. The map segments 822, 824, 826 and 828 which are generated and updated in correspondence to that the data segments 812, 814, 816 and 818 are stored in the memory dies of the memory device 150 are stored in the second buffer 520.

As write commands of a sequential write pattern are received from the host 102 as described above, in each cycle, the controller 130 stores the data segments of user data corresponding to the write commands in the first buffer 510, sequentially programs and stores the data segments of the user data in the memory dies of the memory device 150, generates and updates the map segments of map data, and flushes and stores the map segments of the map data in the memory dies of the memory device 150.

In particular, in the case of performing a map update operation and a map flush operation for map data in each cycle, the controller 130 uses the map segments of map data for which a map update operation and a map flush operation are performed in the first cycle, when performing a map update operation in the second cycle immediately after the first cycle. The map segments of map data for which a map update operation and a map flush operation are performed in the first cycle, that is, the map segments of map data which are updated and flushed in the first cycle, serve as reference data, when performing a map update operation in the second cycle. Detailed description is given below with reference to FIG. 9, for performing command operations corresponding to commands received from the host 102, in the memory dies of the memory device 150, and then performing a map update operation and a map flush operation in correspondence to the performing of the command operations in the memory system in accordance with an embodiment.

Referring to FIG. 9, as described above with reference to FIG. 7, in the first cycle, the controller 130 sequentially programs and stores the first data segments 712, the second data segments 714, the third data segments 716 and the fourth data segments 718 which are stored in the first buffer 510, in the memory die 0, the memory die 1, the memory die 2 and the memory die 3 of the memory device 150, and sequentially generates and updates the first map segments 722, the second map segments 724, the third map segments 726 and the fourth map segments 728 and then flushes and stores them in the memory dies of the memory device 150. After performing the map update operation and the map flush operation for the first map segments 722, the second map segments 724, the third map segments 726 and the fourth map segments 728 during the first cycle, the controller 130 uses select map segments among the map segments 722, 724, r 26 and 728, when performing the map update operation and the map flush operation during the second cycle. That is to say, the select map segments among the map segments 722, 724, 726 and 728 serve as the reference data, when performing the map update operation during the second cycle.

In particular, the controller 130 may select the map segments updated and flushed last, among the map segments 722, 724, 726 and 728 updated and flushed during the first cycle, as the reference data during the second cycle. Alternatively, the controller 130 may check the sizes of the respective map segments 722, 724, 726 and 728 updated and flushed during the first cycle, and select map segments having a largest size, as the reference data during the second cycle. Alternatively, the controller 130 may check overloads for the map update operation and the map flush operation of the map segments 722, 724, 726 and 728 during the first cycle, and select map segments having a largest overload, as the reference data during the second cycle. While it is described as an example that the map segments updated and flushed last during the first cycle are determined as the reference data during the second cycle, it is to be noted that the present disclosure may be applied in the same manner even in the case where sizes or overloads of the map segments 722, 724, 726 and 728 during the first cycle are respectively checked and map segments having a largest size or a largest overload are determined as the reference data. Also, in an embodiment of the present disclosure, among the map segments 722, 724, 726 and 728 updated and flushed during the first cycle, the fourth map segments 728 are determined as the reference data during the second cycle.

In other words, during the first cycle, after programming and storing the fourth data segments 718 stored in the first buffer 510, in the memory die 3 of the memory device 150, the controller 130 generates and updates the fourth map segments 728 in correspondence to that the fourth data segments 718 are stored in the memory die 3. The fourth map segments 728 are stored in the second buffer 520 as described above. The controller 130 flushes and stores the fourth map segments 728 stored in the second buffer 520, in the memory dies of the memory device 150 in this regard, since the fourth map segments 728 serve as the reference data when performing the map update operation during the second cycle, when performing the map flush operation for the fourth map segments 728 stored in the second buffer 520, the controller 130 flushes and stores the fourth map segments 728 stored in the second buffer 520, in not only the memory dies of the memory device 150 but also a memory 906 included in the host 102. Namely, the fourth map segments 728 stored in the second buffer 520 may be stored in the memory dies of the memory device 150 and the memory 906 included in the host 102, through the map flush operation, and may be stored in the second buffer 520 by being cached and buffered. In particular, the fourth map segments 728 are stored in a unified memory (UM) 908 which is included in the memory 906 of the host 102.

The host 102 includes a processor 902, the memory 906 and a device interface 904. The processor 902 of the host 102 controls the general operations of the host 102. In particular, the processor 702 of the host 102 controls commands corresponding to user requests, to be transmitted to the controller 130 of the memory system 110, such that command operations corresponding to the user requests are performed in the memory system 110. The processor 902 of the host 102 may be embodied by a microprocessor or a central processing unit (CPU). In the case where it is checked through a response message or a response signal received from the controller 130 that data to be provided to the host 102 by the controller 130 (host data) exists in the memory 144 of the controller 130 or the memory device 150, the processor 902 of the host 102 allocates memory regions for storing the host data, to a UM 908 included in the memory 906 of the host 102, transmits a read command to the controller 130, receives the host data as a response to the read command, from the controller 130, and stores the host data in the UM 908.

For example, as foreground operations and background operations are performed in the memory device 150, the controller 130 transmits a response message or a response signal to the host 102, and notifies the host 102 through the response message or the response signal that host data corresponding to the performance of the foreground operations and the background operations exists. In the response message or the response signal for notifying that the host data exists, there may be included an information on the type of the host data and an information on the size of the host data. The host 102 allocates memory regions for storing the host data, to the memory 906, in particular, the UM 908, of the host 102 in correspondence to the message or signal received from the controller 130, transmits a read command to the controller 130, receives the host data as a response to the read command, from the controller 130, and stores the host data in the UM 908.

The host 102 transmits, to the controller 130, a read buffer command as a read command for reading the host data existing in the memory 144 of the controller 130 or the memory device 150, and receives, from the controller 130, a response packet as a response to the read buffer command. In the response packet, the host data existing in the memory 144 of the controller 130 or the memory device 150 is included, in particular, the user data or metadata stored in the memory 144 of the controller 130 is included. The response message or the response packet may include a header area and a data area. The information on the type of the host data may be included in the type field of the header area, the information on the size of the host data may be included in the length field of the header area, and the host data may be included in the data area of the response packet. The host 102 stores the host data received from the controller 130 through the response packet, in the UM 908 of the host 102. In the case of receiving, from the controller 130, an update message or an update signal for the host data, the host 102 transmits a read buffer command to the controller 130, receives updated host data from the controller 130, and then stores the updated host data in the UM 908 of the host 102.

In particular, in the case of performing a foreground operation including command operations or a background operation in the memory device 150, the controller 130 performs a map update operation and a map flush operation in correspondence to the performance of the command operations and the background operation. The controller 130 provides, to the host 102, the map data stored in the memory 144 of the controller 130, as a host performance booster (HPB) for improving not only the operational performance of the memory system 110 but also the operational performance of the host 102. Specifically, as described above, the controller 130 provides updated map data to the host 102 in correspondence to the performance of the command operations or the background operation. Accordingly, host data may be map data. After transmitting, to the host 102, a response message or a response signal in which the type information and size information of the map data are included, the controller 130 transmits a response packet in which the map data is included, to the host 102, according to the read buffer command received from the host 102. The controller 130 provides, to the host 102, first map data in correspondence to the performance of the command operations or the background operation. In particular, in the case where an update operation for the first map data is performed, the controller 130 provides updated first map data to the host 102. Therefore, the updated first map data is buffered and cached in the UM 908 of the host 102.)

The memory 906 of the host 102 as the main memory or the system memory of the host 102 stores data for the driving of the host 102, and includes a host use memory region in which data in the host 102 are stored and a device use memory region in which data in the memory system 110 are stored. In the host use memory region as a system memory region in the memory 906 of the host 102, there are stored data or program information on the system of the host 102, for example, a file system or an operating system. In the UM 908 as the device use memory region in the memory 906 of the host 102, there are stored data or information in the memory system 110 in the case where the memory system 110 performs command operations corresponding to the commands received from the host 102, that is, a foreground operation or a background operation. The memory 906 of the host 102 may be embodied by a volatile memory, for example, a static random access memory (SRAM) or a dynamic random access memory (DRAM). The UM 908, as the device use memory region, in the memory 906 of the host 102 is allocated and reported to the memory system 110 when performing a booting operation after the memory system 110 is converted from a power-off state into a power-on state.

The device interface 904 of the host 102, as a host controller interface (HCI), processes the commands and data of the host 102, and may be configured to communicate the memory system 110 through at least one of various interface protocols such as USB (universal serial bus), MMC (multimedia card), PCI-E (peripheral component interconnection-express), SAS (serial-attached SCSI), SATA (serial advanced technology attachment), PATA (parallel advanced technology attachment), SCSI (small computer system interface), ESDI (enhanced small disk interface), IDE (integrated drive electronics) and MIPI (mobile industry processor interface).

In the second cycle, the controller 130 programs and stores the fifth data segments 812 stored in the first buffer 510 in the memory die 0 of the memory device 150, then programs and stores the sixth data segments 814 stored in the first buffer 510 in the memory die 1 of the memory device 150, then programs and stores the seventh data segments 816 stored in the first buffer 510 in the memory die 2 of the memory device 150, and then programs and stores the eighth data segments 818 stored in the first buffer 510 in the memory die 3 of the memory device 150. Further, in the second cycle, the controller 130 generates and updates the fifth map segments 822, the sixth map segments 824, the seventh map segments 826 and the eighth map segments 828, in correspondence to the storage of the fifth data segments 812 in the memory die 0, the storage of the sixth data segments 814 in the memory die 1, the storage of the seventh data segments 816 in the memory die 2 and the storage of the eighth data segments 818 in the memory die 3. When performing the map update operation in the second cycle, the controller 130 checks the reference data, and then, in consideration of the reference data, performs the map update operation for the map segments 822, 824, 826 and 828 in the second cycle.

In detail, in the case of map-updating the map segments 822, 824, 826 and 828 in the second cycle, the controller 130 checks fourth map segments 920 which are stored in the second buffer 520 as the reference data, and, then, updates the map segments 822, 824, 826 and 828 in consideration of the fourth segments 920. The fourth map segments 920 stored in the second buffer 520 are the map segments of map data for which the map update operation and the map flush operation are performed in the first cycle. For example, the fourth map segments 920 stored in the second buffer 520 are, as described above, the map segments which are updated last among the map segments 722, 724, 726 and 728 updated in the first cycle, and accordingly, serve as the reference data when performing the map update operation in the second cycle. Also, the fourth map segments 920 stored in the second buffer 520 are map segments which are stored in the second buffer 520 by being cached and buffered even after they are flushed and stored in the memory dies of the memory device 150 and the UM 908 of the host 102 when performing the map flush operation in the first cycle. In particular, the fourth map segments 920 may be temporarily cached and buffered in the second buffer 520 such that they serve as the reference data when performing the map update operation in the second cycle.

In the case where the fourth map segments 920 do not exist in the second buffer 520 as the reference data in the second cycle, that is, in the case where the fourth map segments 920 as the reference data are not stored in the second buffer 520 by being cached and buffered, the controller 130 loads fourth map segments 910 stored in the UM 908 of the host 102, in the second buffer 520, checks the fourth map segments 910 loaded in the second buffer 520, and updates the map segments 822, 824, 826 and 828 in consideration of the fourth map segments 910. In other words, in the second cycle, the controller 130 checks the fourth map segments 920 stored in the second buffer 520 or the fourth map segments 910 loaded in the second buffer 520 from the UM 908 of the host 102. Accordingly, in the second cycle, the controller 130 checks the fourth map segments 920 or 910 as the reference data when performing the map update operation. Then, the controller 130 updates the map segments 822, 824, 826 and 828 in the second cycle in consideration of the fourth map segments 920 or 910. The case in which the fourth map segments 920 exist in the second buffer 520 as the reference data in the second cycle is described as an example.

That is to say, in the second cycle, in the case of map-updating the map segments 822, 824, 826 and 828 in correspondence to that the data segments 812, 814, 816 and 818 are stored in the memory dies of the memory device 150, the controller 130 checks the fourth map segments 920 stored in the second buffer 520, and map-updates the map segments 822, 824, 826 and 828 in consideration of the fourth map segments 920. The data segments 712, 714, 716 and 718 stored in the memory dies of the memory device 150 in the first cycle and the data segments 812, 814, 816 and 818 stored in the memory dies of the memory device 150 in the second cycle are the data segments of sequential user data corresponding to the write commands of a sequential write pattern, as described above. Thus, through sequential program operations, the controller 130 stores the data segments 712, 714, 716 and 718 in the first cycle and the data segments 812, 814, 816 and 818 in the second cycle, in the memory dies of the memory device 150, and performs map update operations and map flush operations for the sequential map data in correspondence to the sequential program operations. That is to say, the controller 130 checks through the reference data in the second cycle that the map segments 722, 724, 726 and 728 in the first cycle and the map segments 822, 824, 826 and 828 in the second cycle are the map segments of sequential map data, and updates the map segments 822, 824, 826 and 828 in the second cycle.

The controller 130 may perform sequential map update operations for the map segments 722, 724, 726 and 728 in the first cycle and the map segments 822, 824, 826 and 828 in the second cycle. Accordingly, the map segments 722, 724, 726 and 728 in the first cycle and the map segments 822, 824, 826 and 828 in the second cycle may include start position information and size information, and may also include count information and offset information. The controller 130 updates the entire map segments of the map segments 722, 724, 726 and 728 in the first cycle and the map segments 822, 824, 826 and 828 in the second cycle, as sequential map data including start position information and size information, and then, stores the updated sequential map data in the memory dies of the memory device 150, in particular the controller 130 updates, through a map reformat operation or a map compress operation, the entire map segments, some map segments or the respective map segments of the map segments 722, 724, 726 and 728 in the first cycle and the map segments 822, 824, 826 and 828 in the second cycle, as sequential map data including start position information and size information, and then, stores the updated sequential map data in the memory dies of the memory device 150.

After map-updating the map segments 822, 824, 826 and 828 in consideration of the fourth map segments 920 in the second cycle, the controller 130 discards the fourth map segments 920 stored in the second buffer 520 and the fourth map segments 910 stored in the UM 908 of the host 102. Also, the controller 130 determines reference data to be used in a cycle next to the second cycle, among the map segments 822, 824, 826 and 828 updated in the second cycle. The controller 130 determines map segments which are updated last or have a largest size or a largest overload, among the map segments 822, 824, 826 and 828 updated in the second cycle, as the reference data to be used in the cycle next to the second cycle, flushes and stores the map segments determined as the reference data, in the UM 908 of the host 102, and caches and buffers the map segments determined as the reference data in the second buffer 520.

In this way, in the memory system, in accordance with an embodiment of the present disclosure, in the case of performing command operations corresponding to a plurality of commands received from the host 102 in the memory dies of the memory device 150, the map segments of map data corresponding to the performance of the command operations are stored in the UM 908 of the host 102. In particular, in the case of performing a map update operation in correspondence to the performance of the command operations, the map update operation is performed by considering the map segments cached and buffered in the memory 144 of the controller 130 or the map segments loaded in the memory 144 of the controller 130 from the UM 908 of the host 102. As a consequence, barriers in the memory dies which occur when performing sequential command operations and map update operations may be minimized, whereby operational performance in the memory system may be improved. An operation of processing data in a memory system in accordance with an embodiment of the present disclosure will be described in detail with reference to FIG. 10, FIG. 10 is a flow chart describing an operation process of processing data in the memory system 110 in accordance with an embodiment.

Figure 10:
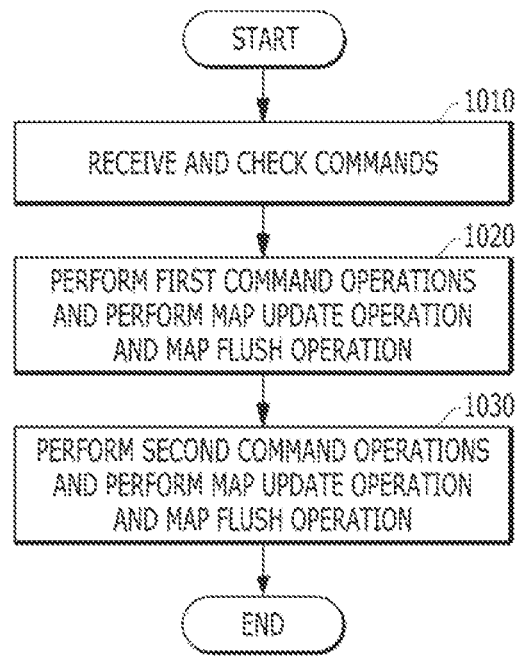
FIG. 10 is a flow chart describing an operation process for processing data in a memory system in accordance with an embodiment of the present invention.

Referring to FIG. 10, at step 1010, the memory system 110 receives a plurality of commands from the host 102, and checks the pattern of the commands received from the host 102. The pattern of the commands received from the host 102 is checked as a sequential pattern. In particular, write commands received from the host 102 are checked as write commands of a sequential pattern. The write commands of the sequential pattern may be provided along with sequential data.

At step 1020, the memory system 110 performs command operations, corresponding to the commands received from the host 102, in the memory dies of the memory device 150, and performs a map update operation and a map flush operation in correspondence to the performance of the command operations. The memory system 110 programs and stores the data segments of the sequential data corresponding to the write commands of a sequential pattern received from the host 102, in the memory dies of the memory device 150. The memory system 110 performs sequential program operations in consideration of channel interleaving, way interleaving and memory die interleaving in the memory dies. The memory system 110 flushes and stores reference data when performing a map update operation according to the write commands of a sequential pattern, in the UM 908 of the host 102, and stores the reference data in the second buffer 520 through caching and buffering. The reference data is determined as map segments which are updated and flushed last or map segments which have a largest size or a largest overload, when performing a map update operation and a map flush operation in correspondence to the performance of the sequential program operations.

Then, at step 1030, the memory system 110 performs command operations corresponding to commands received from the host 102, in particular, a sequential program operation corresponding to write commands of a sequential pattern, in the memory dies of the memory device 150, and performs a map update operation and a map flush operation in correspondence to the performance of the sequential program operation. The memory system 110 performs the sequential program operation in the memory dies of the memory device 150 in consideration of channel interleaving, way interleaving and memory die interleaving, and, by considering the reference data, performs the map update operation and the map flush operation in correspondence to the performance of the sequential program operation.

After performing command operations corresponding to a plurality of commands received from the host 102, a map update operation and a map flush operation in correspondence to the performing of the command operations is performed. Such map update and flush operations were described above with reference to FIGS. 5 to 9; thus, further description thereof is omitted here.

A data processing system and electronic devices to which the above-described memory system 110 including the memory device 150 and the controller 130 may be applied, in accordance with embodiments of the present invention, is described in detail with reference to FIGS. 11 to 19.

Figure 11:
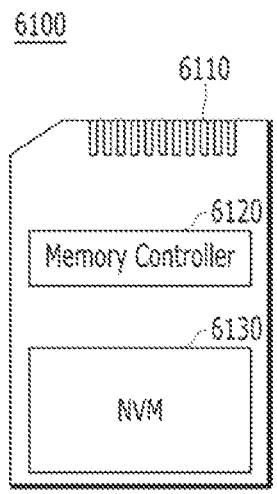
FIGS. 11 to 19 are diagrams schematically illustrating exemplary applications of a data processing system, in accordance with various embodiments of the present invention.

FIG. 11 is a diagram schematically illustrating another example of the data processing system including the memory system in accordance with an embodiment. FIG. 11 schematically illustrates a memory card system to which the memory system may be applied.

Referring to FIG. 11, the memory card system 6100 may include a memory controller 6120, a memory device 6130 and a connector 6110.

More specifically, the memory controller 6120 may be electrically connected to, and configured to access, the memory device 6130 embodied by a nonvolatile memory. For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth, Thus, the memory system and the data processing system may be applied to wired/wireless electronic devices, specifically mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD) Also, the memory controller 6120 and the memory device 6130 may be so integrated to form a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC), and/or a universal flash storage (UFS).

Figure 12:
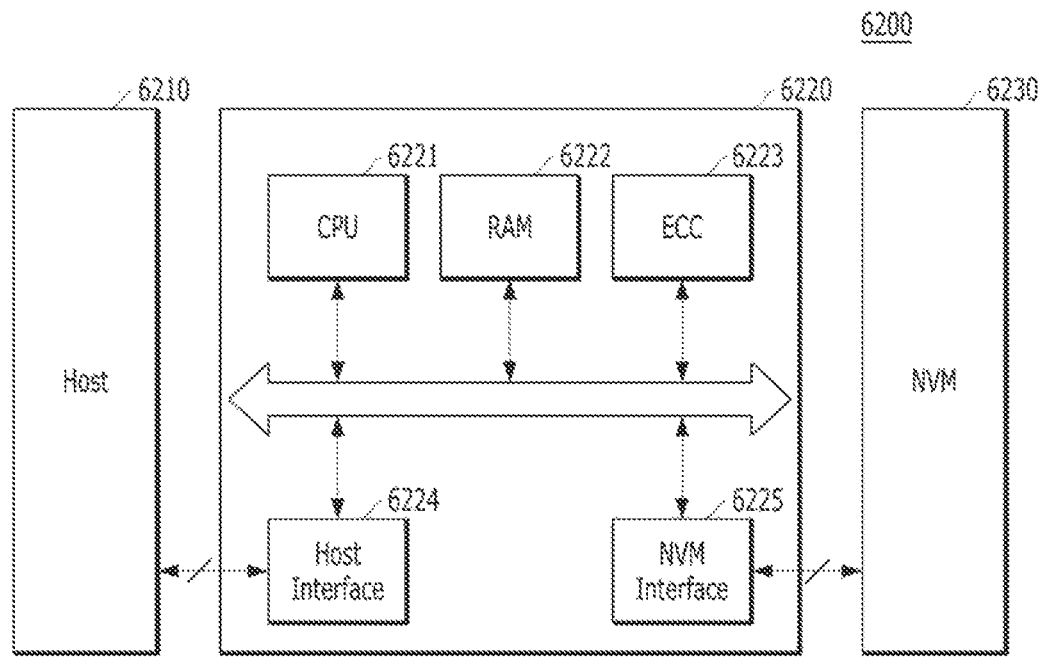

FIG. 12 is a diagram schematically illustrating another example of the data processing system including the memory system in accordance with an embodiment.

Referring to FIG. 12, the data processing system 6200 may include a memory device 6230 having one or more nonvolatile memories and a memory controller 6220 for controlling the memory device 6230. The data processing system 6200 illustrated in FIG. 12 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATIO bus, a BATA bus, a SCSI, an USB, a PCIe or a NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system may be applied to wired/wireless electronic devices, particularly a mobile electronic device.

Figure 13:
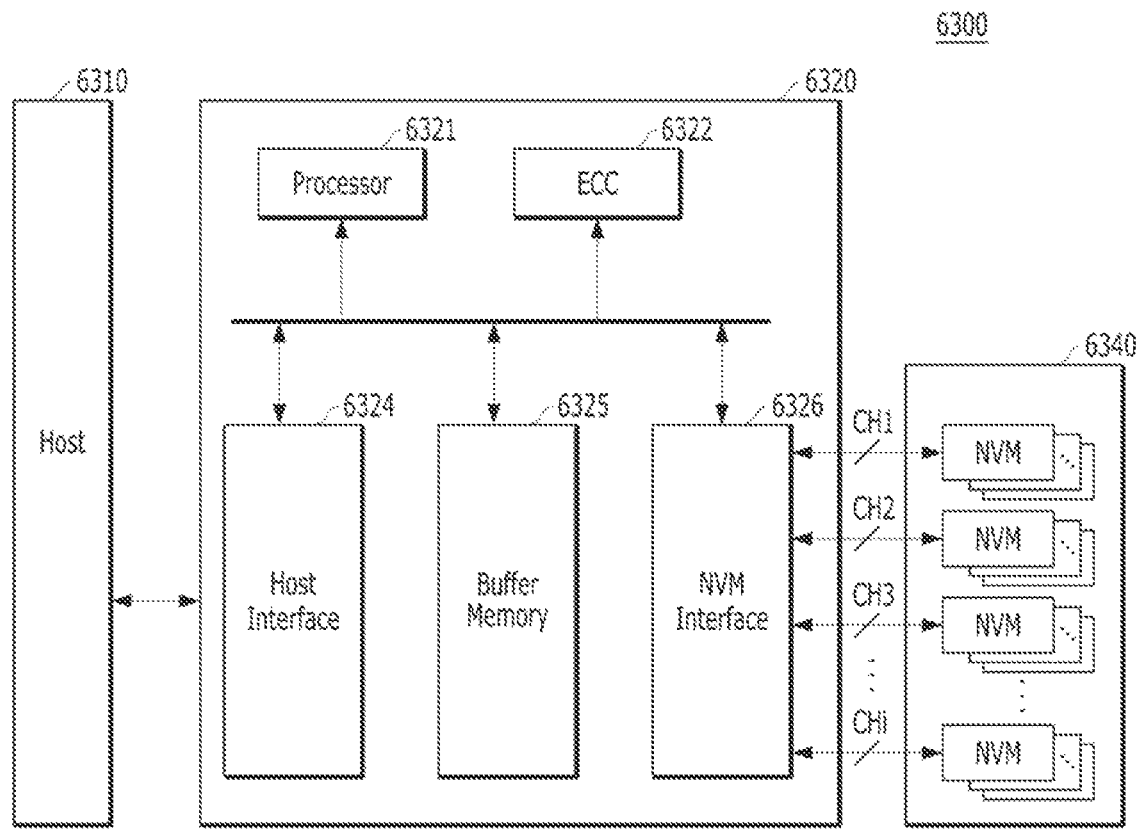

FIG. 13 is a diagram schematically illustrating another example of the data processing system including the memory system in accordance with an embodiment. FIG. 13 schematically illustrates an SSD to which the memory system may be applied.

Referring to FIG. 13, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a DRAM, a SDRAM, a DDR SDRAM, a LPDDR SDRAM and a GRAM or nonvolatile memories such as a FRAM, a ReRAM, a STT-MRAM and a PRAM. FIG. 13 illustrates that the buffer memory 6325 is embodied in the controller 6320. However, the buffer memory 6325 may be external to the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a RAID (Redundant Array of Independent Disks) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
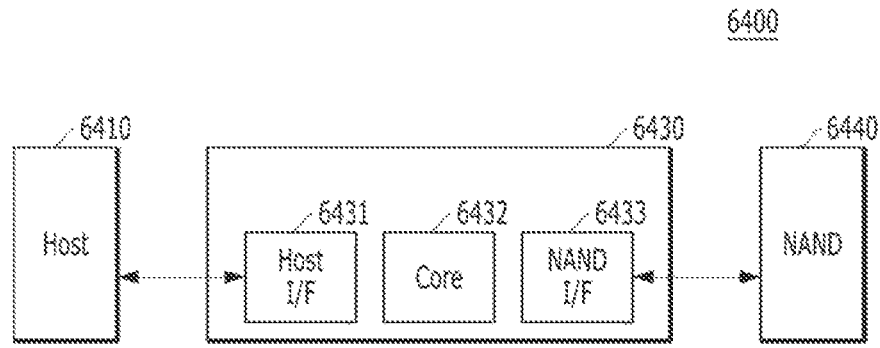

FIG. 14 is a diagram schematically illustrating another example of the data processing system including the memory system in accordance with an embodiment. FIG. 14 schematically illustrates an embedded Multi-Media Card (eMMC) to which the memory system may be applied.

Referring to FIG. 14, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 15 to 18 are diagrams schematically illustrating other examples of the data processing system including the memory system in accordance with embodiments, FIGS. 15 to 18 schematically illustrate UFS (Universal Hash Storage) systems to which the memory system may be applied.

Referring to FIGS. 15 to 18, the UFS systems 6500, 6600, 6700, 5800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 5820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 11 to 13, and the UFS cards 6530, 6530, 6730, 6830 may be embodied in the form of the memory card system 6100 described with reference to FIG. 11.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through any of various protocols other than the UFS protocol, for example, an UFDs, a MMC, a SD, a mini-SD, and a micro-SD.

Figure 15:
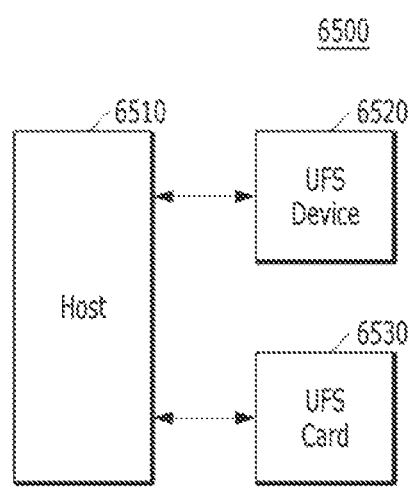

In the UFS system 6500 illustrated in FIG. 15, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 16:
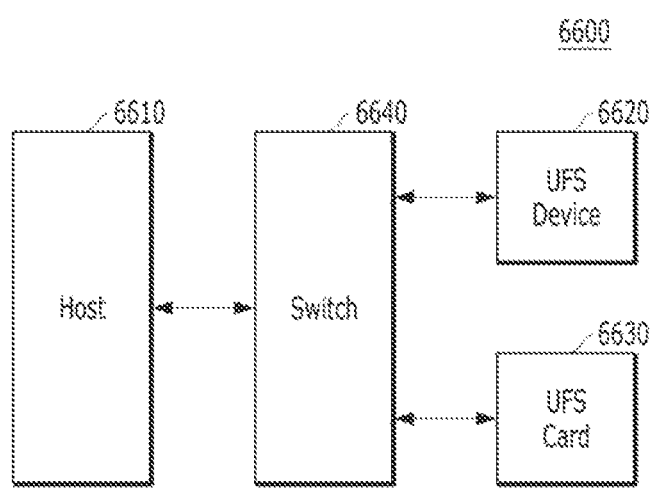

In the UFS system 6600 illustrated in FIG. 16, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 17:
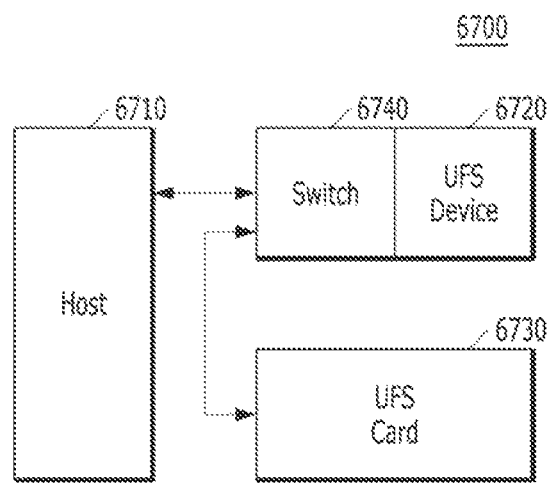

In the UFS system 6700 illustrated in FIG. 17, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 18:
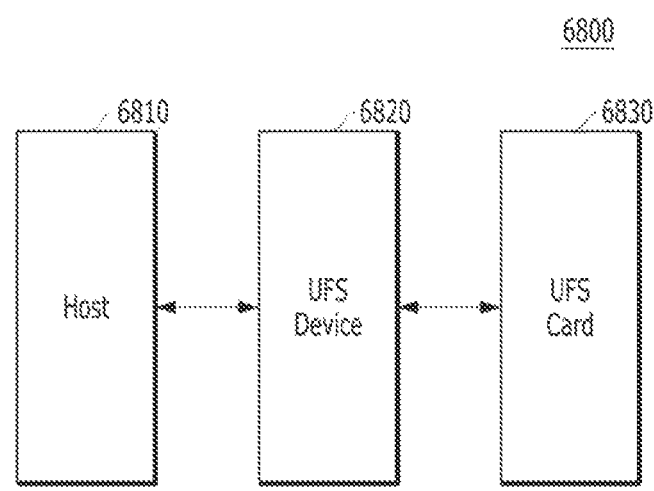

In the UFS system 6800 illustrated in FIG. 18, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 19:
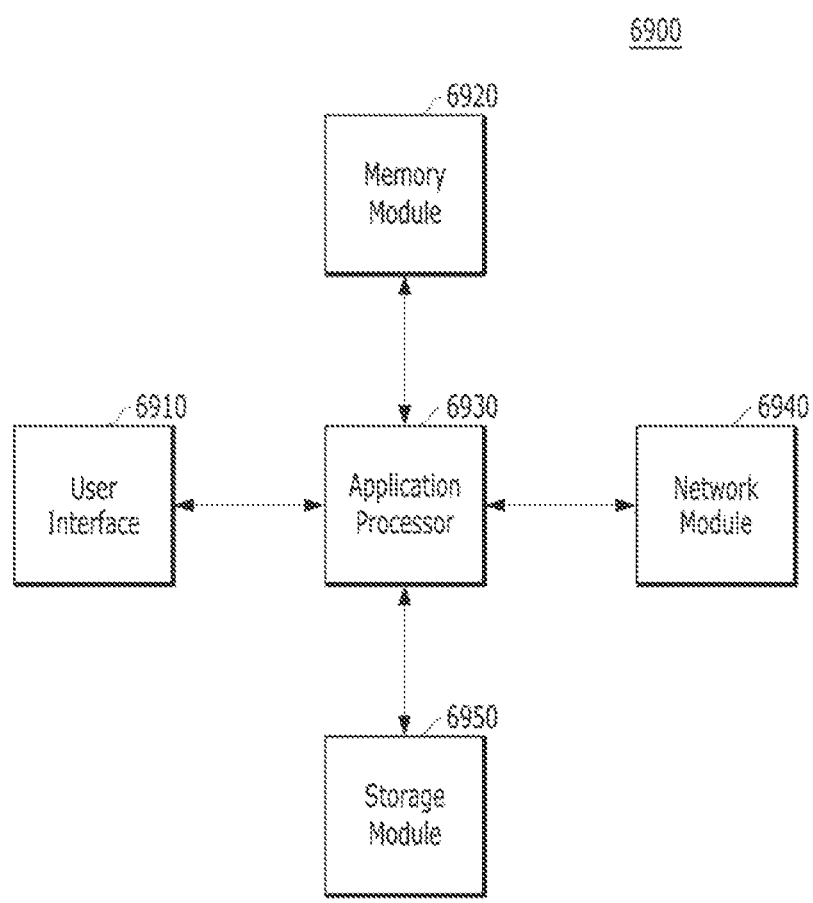

FIG. 19 is a diagram schematically illustrating another example of the data processing system including the memory system in accordance with an embodiment of the present invention. FIG. 19 is a diagram schematically illustrating a user system to which the memory system may be applied.

Referring to FIG. 19, the user system 6900 may include an application processor 6930, a memory module 6920, a network module 6940, a storage module 6950 and a user interface 6910.

More specifically, the application processor 6930 may drive components in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as a DRAM, a SDRAM, a DDR SDRAM, a DDR2 SDRAM, a DDR3 SDRAM, a LPDDR SDARM, a LPDDR3 SDRAM or a LPDDR3 SDRAM or a nonvolatile RAM such as a PRAM, a ReRAM, a MRAM or a FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

In accordance with embodiments of the present invention, since the read reclaim operation is performed on a victim block based on read counts of memory blocks instead of a host read amount, the frequency of the read reclaim operation may be adjusted considering an actual extent of damage of the memory blocks.

The memory system and the operating method thereof according to embodiments may minimize complexity and performance deterioration of the memory system and maximize use efficiency of a memory device, thereby quickly and stably processing data with respect to the memory device.

Although various specific embodiments have been described and illustrated, it will be apparent to those skilled in the art in light of this disclosure that various changes and modifications may be made without departing from the spirit and scope of the invention as defined in the following claims.

What is claimed is:

1. A data processing system comprising:
   a memory device including a plurality of memory blocks;
   a controller including a first memory; and
   a host including a second memory and configured to provide a plurality of commands for user data to the controller;
   wherein the controller stores data segments of the user data in the first memory, controls the memory device to store the data segments in the memory blocks,
   updates logical-to-physical (L2P) mapping entries of map data in response to storage of the data segments in the memory blocks and stores the updated L2P mapping entries in the first memory,
   assists the host to store the updated L2P mapping entries to the second memory in the host, and
   wherein the controller controls the memory device to store the updated L2P mapping entries, stored in the first memory, in the memory blocks,
   wherein the controller updates a second L2P mapping entry group of L2P mapping entries by referencing some part of a first L2P mapping entry group of the L2P mapping entries that has already been updated.

2. The data processing system according to claim 1, wherein the controller transmits a response including the second L2P mapping entry group to the host when a read buffer command for requesting data stored in the first memory is received from the host.

3. The data processing system according to claim 1, wherein the controller stores a first data segment group of the data segments in the first memory and controls the memory device to store the first data segment group in the memory blocks through interleaving, in a first cycle, and stores a second data segment group of the data segments in the first memory and controls the memory device to store the second data segment group in the memory blocks, through interleaving, in a second cycle following the first cycle.

4. The data processing system according to claim 3, wherein the controller updates the first L2P mapping entry group of the L2P mapping entries in response to storage of the first data segment group in the memory blocks, stores the first L2P mapping entry group in the first memory, and assists the host in storing first L2P mapping entries in the first L2P mapping entry group in the second memory.

5. The data processing system according to claim 4, wherein the controller updates the second L2P mapping entry group of the L2P mapping entries in response to storage of the second data segment group in the memory blocks by referring to the first L2P mapping entries, stores the second L2P mapping entry group in the first memory, assists the host in discarding the first L2P mapping entries stored in the second memory, and controls the memory device to store L2P mapping entry groups stored in the first memory in the memory blocks.

6. The data processing system according to claim 5, wherein, in the case where the first L2P mapping entries exist in the first memory, the controller updates the second L2P mapping entry group by referring to the first L2P mapping entries in the first memory.

7. The data processing system according to claim 5, wherein, in the case where the first L2P mapping entries do not exist in the first memory, the controller updates the second L2P mapping entry group by referring to the first L2P mapping entries stored in the second memory.

8. The data processing system according to claim 5, wherein the first L2P mapping entries are at least one of: L2P mapping entries among L2P mapping entries which are updated last, L2P mapping entries which have a largest size, and L2P mapping entries which have a largest overload.

9. The data processing system according to claim 1,
wherein the commands have a sequential pattern, and
wherein the user data and the map data are sequential data.

10. The data processing system according to claim 1, wherein the controller updates the L2P mapping entries as the map data in which start position information and size information are included, and controls the memory device to store the updated map data in the memory blocks.

11. The data processing system according to claim 1, wherein the controller controls the memory device to store the data segments and the L2P mapping entries in the memory blocks through at least one of channel interleaving, way interleaving, and memory block interleaving.

12. A controller comprising:
a first memory storing logical-to-physical (L2P) mapping entries of map data; and
a processor configured to control a first external including a plurality of memory blocks to store data segments of user data, corresponding to a plurality of commands received from a second external,
update the L2P mapping entries of the map data corresponding to storage of the data segments in the memory blocks and stores the updated L2P mapping entries in the first memory,
assist the second external to store the updated L2P mapping entries to a second memory in the second external, and
wherein the processor controls the first external to store the L2P mapping entries, stored in the first memory, in the memory blocks,
wherein the controller updates a second L2P mapping entry group of the L2P mapping entries by referencing some part of a first L2P mapping entry group of the L2P mapping entries that has already been updated.

13. The controller according to claim 12, wherein the processor transmits a response including the second L2P mapping entry group to the second external when a read buffer command for requesting data stored in the first memory is received from the second external.

14. The controller according to claim 12, wherein the processor stores a first data segment group of the data segments in the first memory and controls the first external to store the first data segment group in the memory blocks through interleaving, in a first cycle, and stores a second data segment group of the data segments in the first memory and controls the first external to store the second data segment group in the memory blocks, through interleaving, in a second cycle following the first cycle.

15. The controller according to claim 14, wherein the processor updates the first L2P mapping entry group of the L2P mapping entries corresponding to storage of the first data segment group in the memory blocks, stores the first L2P mapping entry group in the first memory, and assists the second external in storing first L2P mapping entries in the first L2P mapping entry group in the second memory.

16. The controller according to claim 15, wherein the controller updates the second L2P mapping entry group of the L2P mapping entries corresponding to storage of the second data segment group in the memory blocks by referring to the first L2P mapping entries, stores the second L2P mapping entry group in the first memory, assists the second external in discarding the first L2P mapping entries stored in the second memory, and controls the first external to store L2P mapping entry groups stored in the first memory in the memory blocks.

17. The controller according to claim 16, wherein, in the case where the first L2P mapping entries exist in the first memory, the processor updates the second L2P mapping entry group by referring to the first L2P mapping entries in the first memory.

18. The controller according to claim 16, wherein, in the case where the first L2P mapping entries do not exist in the first memory, the processor updates the second L2P mapping entry group by referring to the first L2P mapping entries stored in the second memory.

19. The controller according to claim 16, wherein the first L2P mapping entries are at least one of: L2P mapping entries among L2P mapping entries which are updated last, L2P mapping entries which have a largest size, and L2P mapping entries which have a largest overload.

20. The controller according to claim 12,
wherein the commands have a sequential pattern, and
wherein the user data and the map data are sequential data.

21. The controller according to claim 12, wherein the processor updates the L2P mapping entries as the map data in which start position information and size information are included, and controls the first external to store the updated map data in the memory blocks.

22. The controller according to claim 12, wherein the processor controls the first external to store the data segments and the L2P mapping entries in the memory blocks through at least one of channel interleaving, way interleaving, and memory block interleaving.

23. A memory system comprising:
a memory device including a plurality of blocks; and
a controller including a first memory,
wherein the controller stores data segments of user data, in response to a plurality of commands received from a host, in the first memory, controls the memory device to store the data segments in the blocks,
updates logical-to-physical (L2P) mapping entries in response to storage of the data segments in the blocks, stores the updated L2P mapping entries in the first memory, and controls the memory device to store the updated L2P mapping entries stored in the first memory, in the blocks, and provides a response including the updated L2P mapping entries to the host in response to a read buffer command from the host, wherein the controller updates a second L2P mapping entry group of L2P mapping entries by referencing some part of a first L2P mapping entry group of the L2P mapping entries that has already been updated.

24. The memory system according to claim 23, wherein the controller stores a first data segment group of the data segments in the first memory and controls the memory device to store the first data segment group in the blocks through interleaving, in a first cycle, and stores a second data segment group of the data segments in the first memory and controls the memory device to store the second data segment group in the blocks, through interleaving, in a second cycle following the first cycle.

25. The memory system according to claim 24, wherein the controller updates the first L2P mapping entry group of the L2P mapping entries in response to storage of the first data segment group in the blocks, stores the first L2P mapping entry group in the first memory, and assists the host in storing first L2P mapping entries in the first L2P mapping entry group in the second memory.

26. The memory system according to claim 25, wherein the controller updates the second L2P mapping entry group of the L2P mapping entries in response to storage of the second data segment group in the blocks by referring to the first L2P mapping entries, stores the second L2P mapping entry group in the first memory, assists the host in discarding the first L2P mapping entries stored in the second memory, and controls the memory device to store L2P mapping entry groups stored in the first memory in the blocks.

27. The memory system according to claim 26, wherein, in the case where the first L2P mapping entries exist in the first memory, the controller updates the second L2P mapping entry group by referring to the first L2P mapping entries in the first memory.

28. The memory system according to claim 26, wherein, in the case where the first L2P mapping entries do not exist in the first memory, the controller updates the second L2P mapping entry group by referring to the first L2P mapping entries stored in the second memory.

29. The memory system according to claim 26, wherein the first L2P mapping entries are at least one of: L2P mapping entries among L2P mapping entries which are updated last, L2P mapping entries which have a largest size, and L2P mapping entries which have a largest overload.

30. The memory system according to claim 23, wherein the controller updates the L2P mapping entries as map data in which start position information and size information are included, and controls the memory device to store the updated map data in the blocks.

\* \* \* \* \*